(12) United States Patent
Yoshida et al.

(10) Patent No.: US 6,499,236 B2
(45) Date of Patent: Dec. 31, 2002

(54) SNOW REMOVING MACHINE

(75) Inventors: Isao Yoshida, Wako (JP); Yasunori Yamamoto, Wako (JP); Norikazu Shimizu, Wako (JP); Seishu Sakai, Wako (JP); Masakatsu Kono, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/893,719

(22) Filed: Jun. 28, 2001

(65) Prior Publication Data

US 2002/0005001 A1 Jan. 17, 2002

(30) Foreign Application Priority Data

Jul. 12, 2000 (JP) ........................................ 2000-210828
Jul. 26, 2000 (JP) ........................................ 2000-225635

(51) Int. Cl.⁷ .......................... A63C 19/10; E01H 5/06; B62D 51/04
(52) U.S. Cl. ........................... 37/219; 37/234; 37/266; 180/19.3; 74/525
(58) Field of Search ................. 37/234, 260, 257, 37/246, 244, 243, 249, 219, 261, 266, 262, 263, 265, 271; 100/19.1; 180/19.2, 19.3, 68.5, 65.2; 74/523, 471 R, 554, 551.5

(56) References Cited

U.S. PATENT DOCUMENTS

| | | | | |
|---|---|---|---|---|
| 3,580,351 A | * | 5/1971 | Mollen ...................... 180/19.1 |
| 3,867,773 A | * | 2/1975 | Gunderson ................... 193/22 |
| 3,938,400 A | * | 2/1976 | Konyha ..................... 180/6.66 |
| 4,255,879 A | * | 3/1981 | Greider ....................... 172/42 |
| 4,335,566 A | * | 6/1982 | Hurd ........................... 56/11.3 |
| 4,476,643 A | * | 10/1984 | Hilchey et al. ............. 180/19.3 |
| 4,756,101 A | * | 7/1988 | Friberg et al. ................ 37/244 |
| 4,783,915 A | * | 11/1988 | Sasaki et al. ................. 37/251 |
| 5,020,250 A | * | 6/1991 | Fujii et al. .................... 37/244 |
| 5,438,770 A | * | 8/1995 | Miller ......................... 37/227 |
| 6,058,629 A | * | 5/2000 | Peterson et al. .............. 37/261 |
| 6,098,385 A | * | 8/2000 | Turk ........................... 56/11.1 |
| 6,131,316 A | * | 10/2000 | Yoshina et al. ............... 37/242 |
| 6,327,799 B1 | * | 12/2001 | Hanafusa et al. ............. 37/257 |

FOREIGN PATENT DOCUMENTS

| | | | |
|---|---|---|---|
| JP | 61023059 | | 5/1982 |
| JP | 2-38606 | * | 2/1990 |
| JP | 11-29914 | * | 2/1999 |
| JP | 2000-144666 | * | 5/2000 |
| JP | 2000-290951 | * | 10/2000 |

* cited by examiner

Primary Examiner—Thomas B. Will
Assistant Examiner—Thomas A. Beach
(74) Attorney, Agent, or Firm—Adams & Wilks

(57) ABSTRACT

A snow removing machine has a vehicle body having a body frame, a snow removing section mounted on a front portion of the body frame for removing snow, an operating handle mounted to a rear portion of the body frame and having a first handle portion and a second handle portion, and a pair of grip portions each mounted on a respective one of the first and second handle portions of the operating handle. A forward and aft drive changeover switch is directly mounted on the first handle portion of the operating handle for changing over a traveling direction of the vehicle body. A height control operation lever is directly mounted on the first handle portion of the operating handle for adjusting a height of the snow removing section. A speed control operation lever is directly mounted on the second handle portion of the operating handle for adjusting a traveling speed of the vehicle body.

20 Claims, 15 Drawing Sheets

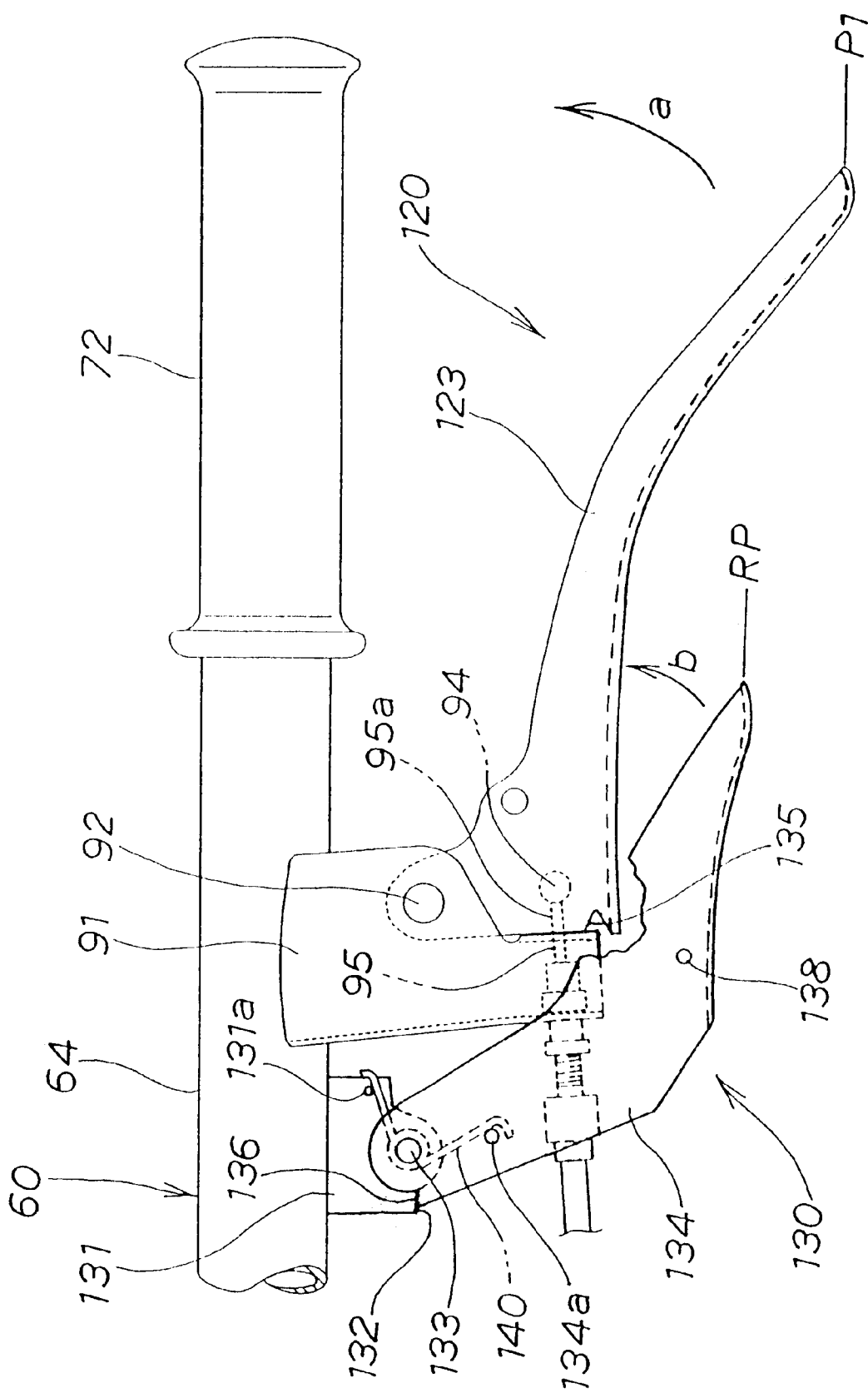

SNOW REMOVING MACHINE

BACKGROUND OF THE INVENTION

1. Field of the Invention

The present invention relates to an improvement in a snow removing machine comprising a body which includes a front portion with a snow removing section mounted thereto and a rear portion with an operating handle mounted thereto and having left and right grip portions to be gripped by an operator.

2. Description of the Related Art

In recent years, walking type snow removing machines having snow removing plates, which are propelled by means of crawler belts, have been widely used to reduce snow removing labor. One of such snow removing machines is arranged to enable snow removal work with the snow removing plate while adjusting the height of the snow removing plate by gripping grip portions of an operating handle with operator's hands and by shifting the operating handle upward or downward.

FIG. 14 hereof shows such an operating handle of a prior art snow removing machine with a snow removing plate. The known snow removing machine 200 with the snow removing plate includes left and right operating handles 201, 201, which are spaced from one another. The left and right operating hands 201, 201 have respective left and right grip portions 202, 204. A clutch lever 203 is located in the vicinity of the left grip portion 202. An operation box 205 is mounted between the left and right handles 201, 201. The operation box 205 includes a shift lever 207 for changing over a forward and aft drive as well as a vehicle speed, and a governor control lever 208 located in the vicinity of the shift lever 207 for adjusting an engine speed.

During snow removing work using the snow removing machine having the snow removing plate, the engine is first operated and, then, the respective left and right grip portions 202, 204 are gripped with the operator's left and right hands to thereby operate the snow removing plate via the operating handle 201.

During the snow removing work, the changeover between the forward and aft drive and the control of the vehicle speed are carried out by manipulating the clutch lever 203 with his left hand gripping the left grip portion 202 and, under such a condition, by manipulating the shift lever 207 with his right hand released from the right grip portion 204.

Further, upon adjustment of the engine speed, the governor control lever 208 is manipulated with the right hand released from the right grip portion 204.

When manipulating the clutch lever 207 and the governor control lever 208 with the right hand released from the right grip portion 204 during the snow removing work, it is required for the operator to manipulate the operating handle 201 by a single hand operation gripping only the left grip portion 202. This results in an increased load for the operator's hands or arms.

When manipulating the operating hand 201 in the single hand operation, the operator encounters difficulty in determining the traveling direction of the snow removing machine 200. Especially in cases where there exists relatively large irregular road surfaces or in cases where snow contains a large amount of water, the snow removing plate is exerted with an increased load, thereby making the manipulation difficult to achieve with a single hand. Thus, the snow removing work should be inevitably interrupted once, thereby disturbing the improvement in the snow removing work efficiency.

A snow removing machine, which includes a rotary snow removing unit mounted to a front part of its body and crawls over snow through crawler belts to remove the snow, is disclosed, for example, in Japanese Utility Model Publication No. SHO-61-23059. The snow removing machine includes a height adjustment mechanism having indispensable components such as a cylinder, a piston and a piston rod for adjusting the height of the rotary snow removing unit, and an operation lever located in the vicinity of the grip portion for manipulating the height adjustment mechanism. The snow removing machine is arranged so as to adjust the height of the rotary snow removing unit by maintaining the height adjustment mechanism in a free condition under a gripped state of the operation lever and by moving the grip portion upward or downward. In such a snow removing machine, adjusting the height of the rotary snow removing unit enables the rotary snow removing unit to perform the snow removing work in dependence on irregular profiles or undulations of the snow surface.

However, in order to adjust the height of the rotary snow removing unit so as to meet the irregular profiles or the undulations, which consecutively extend, of the snow surface, the operator needs to implement two different operations involving one step of gripping the operation lever and the other step of moving the grip portion upward or downward, with a relatively increased load to be exerted to the operator. In addition, the upward or downward movement of the grip portion while gripping the operation lever causes difficulty to the operator in concentrating the upward or downward movement of the grip portion, thereby disturbing the improvement in the snow removing work efficiency.

SUMMARY OF THE INVENTION

It is therefore an object of the present invention to provide a snow removing machine which effectively reduces a load on an operator's snow removing work to provide improved snow removing work efficiency.

According to an aspect of the present invention, there is provided a snow removing machine which comprises a vehicle body having a body frame, a snow removing section mounted to a front portion of the body frame for removing snow, an operating handle mounted to a rear portion of the body frame for performing operation, left and right grip portions mounted to the operating handle to be gripped by an operator, a forward and aft drive changeover switch mounted on one of the left and right grip portions for changing over a traveling direction of the vehicle body, a height control operation lever for adjusting a height of the snow removing section and a speed control operation lever mounted to the other one of the left and right grip portions for adjusting a traveling speed of the vehicle body.

In the thus-arranged snow removing machine, the forward and aft drive changeover switch and the height control operation lever, which adjusts the height of the snow removing section, are mounted on one of the grip portions, and the speed control operation lever is mounted on the other one of the grip portions. Under a circumstance wherein the respective grip portions are kept in a grip condition being gripped with operator's both hands, as the operator uses his one hand to manipulate the forward and aft drive switch and the height control operation lever, it is possible for his other hand to manipulate the speed control operation lever. Consequently, the operator is enabled to use his both hands to operate the operating handle without carrying out a single hand operation.

Desirably, the snow removing machine further comprises a traveling frame for supporting drive wheels and idling wheels, between which crawler belts are stretched, by means of vehicular shafts, a height adjustment mechanism mounted between the traveling frame and the vehicle body to allow the height of the snow removing section to be adjusted when the height control operation lever is gripped to be brought into a free condition to enable tilting of the vehicle body and is subsequently released to be brought into a lock position, and a lever lock mechanism mounted to the operating handle having the one of the grip portion for allowing the height control operation lever to be locked for preventing the height control operation lever from returning from a position in a gripped state of the height control operation lever.

Thus, the presence of the lever lock mechanism mounted to the operating handle and enabled to allow the height control operation lever to be locked with the lever lock mechanism in a position gripped by the operator does not need to perform two different operations at the same time for raising or lowering the operating handle while manipulating the operation lever during adjustment of the snow removing section. As a consequence, it might be enough for the operator to merely operate the upward or downward operation of the operating handle.

In a preferred example arrangement, the lever lock mechanism comprises a lever segment mounted to the operating handle for swinging movement and having a lock recess, a spring member for retaining the lever segment in a lock position or a releasing position, and a lock pin located on the operation lever and capable of entering and engaging with the lock recess in a state wherein the lever segment is retained in the releasing position. With such a lever lock mechanism, the mere swinging movement of the lever segment of the lever lock mechanism allows the lock recess and the lock pin to engage with each other. Accordingly, the simple operation for the mere swinging movement of the lever segment renders the height control operation lever to be locked in a position gripped by the operator. The lever lock mechanism is constructed of three components of the lever segment, the spring member and the lock pin, with a resultant compact structure in the lever lock mechanism with a lowered cost.

In a second preferred example arrangement, the lever lock mechanism comprises a lever segment mounted to the operating handle for swinging movement, a spring member for retaining the lever segment in a releasing position, and a lock pin protruding from the lever segment and capable of engaging with the lock recess formed in the height control operation lever when the lever segment swings in a direction toward the lock position. With such a lever lock mechanism, the mere swinging movement of the lever segment of the lever lock mechanism allows the lock recess and the lock pin to engage with each other in the same manner as the first preferred example. Accordingly, the simple operation for the mere swinging movement of the lever segment renders the height control operation lever to be locked in a position gripped by the operator. The lever lock mechanism is constructed of three components of the lever segment, the spring member and the lock pin, with a resultant compact structure in the lever lock mechanism with a lowered cost.

In a preferred form, the height adjustment mechanism comprises a cylinder connected to one of the vehicle body and the traveling frame, a piston rod connected to the other one of the vehicle body and the traveling frame, a piston interconnected to the piston rod and received in the cylinder, a control valve located in the piston, and a force transmission member for transmitting a force, which opens the control valve, to the control valve in response to gripping motion of the operation lever, wherein high pressure gas is filled in the cylinder at both sides thereof. With such a height adjustment mechanism, the presence of the high pressure gas filled in the cylinder allows the control valve, when it is opened, to smoothly pass the high pressure gas. Comparing a case wherein oil is filled in the cylinder, the piston is enabled to move in a more smooth manner. This allows the operating handle to move upward or downward in a simpler manner, with a resultant further decrease in a load for the operator. Further, the presence of the high pressure gas filled in the cylinder allows impacts or vibrations, caused by the road surfaces or the snow surfaces, to be effectively absorbed with a compressive action of the high pressure gas when the control valve is closed.

BRIEF DESCRIPTION OF THE DRAWINGS

Certain preferred embodiments of the present invention will be described in detail below, byway of example only, with reference to the accompanying drawings, in which:

FIG. 12 is an enlarged view showing a right operating handle of the snow removing machine according to the second preferred embodiment shown in FIG. 11;

DETAILED DESCRIPTION OF THE PREFERRED EMBODIMENTS

The following description is merely exemplary in nature and is in no way intended to limit the invention, its application or uses.

Figure 1:
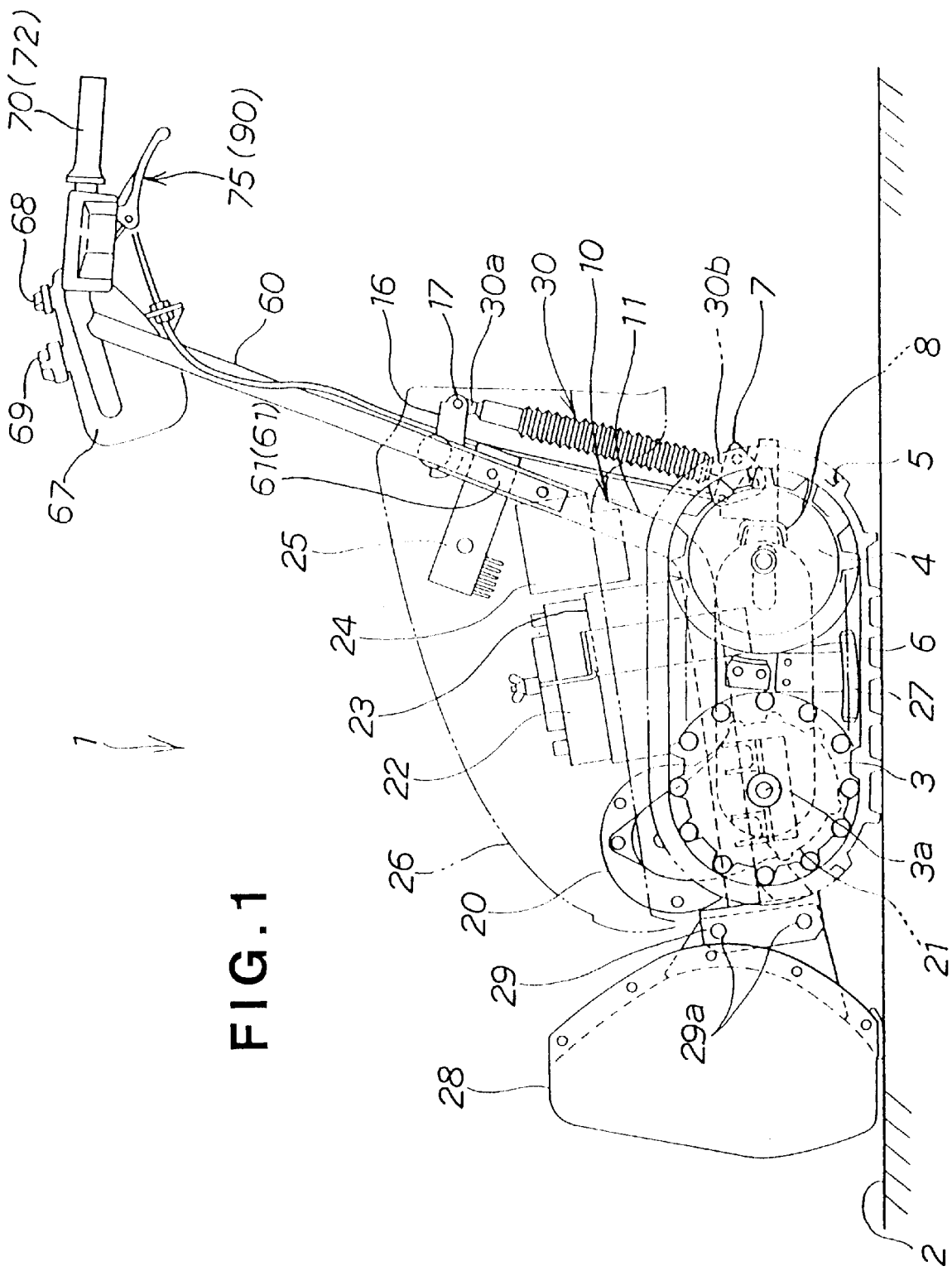
FIG. 1 is a side elevational view showing a snow removing machine, having a snow removing plate, according to a first preferred embodiment of the present invention.
Figure 3:
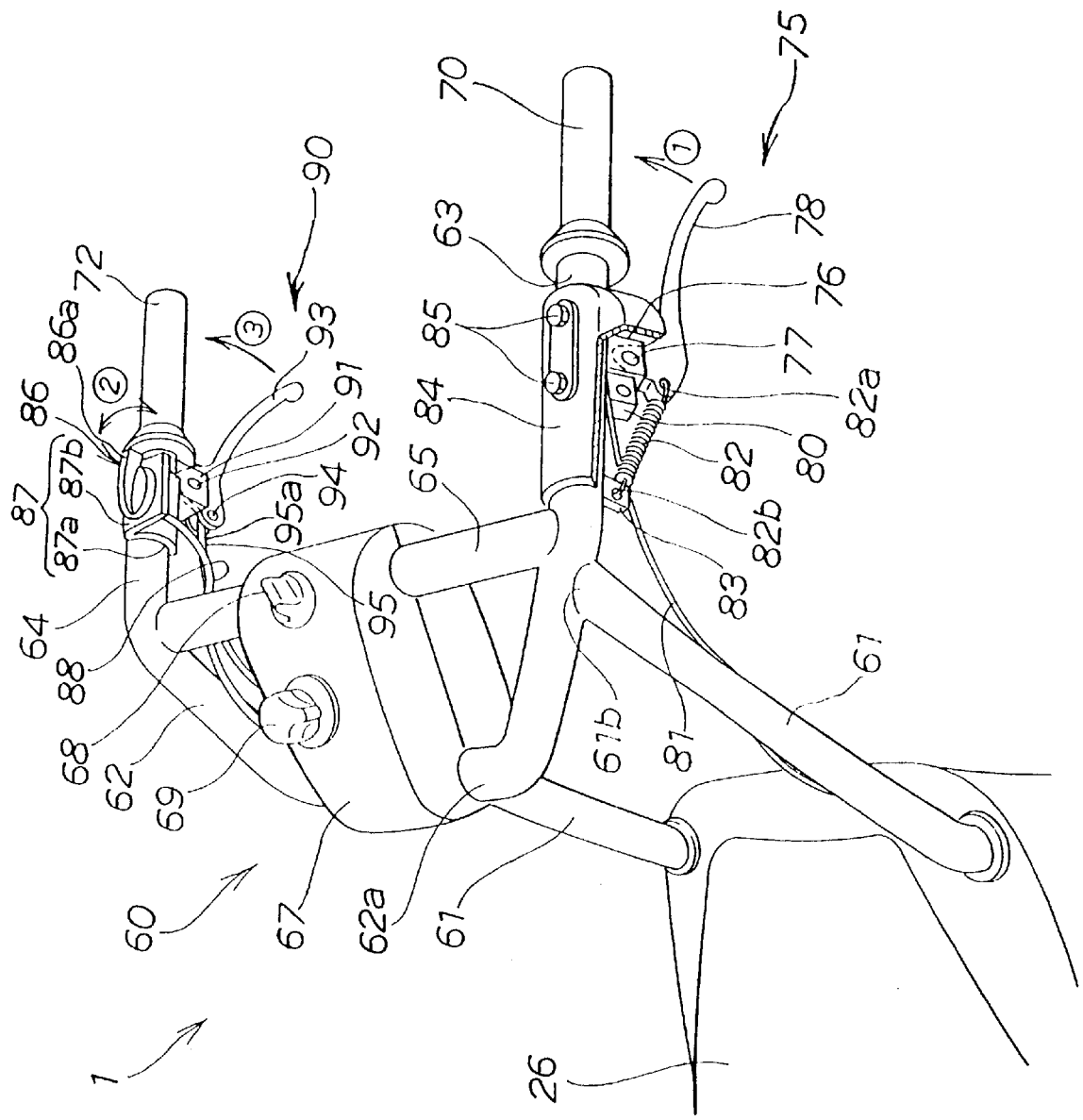
FIG. 3 is an enlarged, perspective view of an operating handle of the snow removing machine shown in FIG. 1.

Referring now to FIG. 1, a self-propelled snow removing machine, generally designated at 1, includes a pair of traveling frames (of which only a left side frame is shown) 6,6 which are laterally spaced from one another in a traveling direction. A vehicle body 10 is mounted on the traveling frames 6,6 for upward or downward swinging movement. A front portion of the vehicle body 10 has a snow removal-working section (a snow removing plate) 28. A height adjustment mechanism 30, which functions to adjust the height of the snow removing plate 28, is mounted between the traveling frames 6,6 and the vehicle body 10 by means of a cross member 8 which is connected between rear end portions of the traveling frames 6,6. The presence of the height adjustment mechanism 30 allows a tilting angle of the body frame to be determined relative to the traveling frames 6,6. An operating handle 60 is fixedly supported with a rear portion of the body frame 10. The operating handle 60 has a speed control lever unit 75 and a height control lever unit 90. As seen in FIG. 3, gripping an operation lever 93 of the lever unit 90 renders the height adjustment mechanism 30 to be brought into a free condition to allow the vehicle body 10 to swing about an axis of a drive wheel shaft 3a upward or downward to vary the tilting angle of the vehicle body 10. Releasing the operation lever 93 renders the height adjustment mechanism 30 to be brought into a locked condition.

The snow removing machine 1 is constructed so as to have a lever locking mechanism 100 (see FIG. 9) which is mounted on the operation lever 93 for permitting the operation lever 93 to be locked in a fixed position to avoid its dislocation.

The traveling frames 6,6 rotatably support drive wheels 3,3 and idling wheels 4,4 via respective shafts. A pair of crawler belts 5,5 (of which only a left side crawler belt is shown) are stretched over between respective pairs of the drive wheels 3,3 and the idling wheels 4,4.

The vehicle body 10 includes a substantially L-shaped body frame 11 as viewed from a side of the snow removing machine. Front portions of the body frame 11 carry thereon an electric motor 20 and a power transmission mechanism 21. A battery 22 is mounted on the body frame 11 at a rear position of the electric motor 20 and the power transmission mechanism 21. A battery charger 24 and a control unit 25 are mounted on the body frame 11 at a rear part of the battery 25. A cover 26, which is mounted to the body frame 11, serves to conceal the electric motor 20, the power transmission mechanism 21, the battery 22, the battery charger 24 and the control unit 25.

The battery 22 serves as a power supply for supplying electric power output to the electric motor 20 and is mounted on an upper portion of the body frame 11 by means of a battery receiver box 23.

The battery charger 24 has a plug (not shown) which is enabled to be coupled to an electric outlet of an alternating power supply such as a domestic power supply for charging the battery 22. The battery charger 24 is mounted to the body frame 11 at a position rearward of the battery receiver box 23.

The control unit 25 functions to control the electric motor 20 on the basis of output signals delivered from a forward-aft drive changeover switch, a potentiometer, a main switch and a maximum speed presetting switch, etc., which will be described in detail below. The control unit 25 is mounted to the body frame 11 at a position above the battery charger 24. Reference numeral 27 designates a stopper member for protecting the crawler belt 5 from lifting from the road surface.

The snow removing plate 28 is mounted to a mounting bracket 29, which is coupled to the front portion of the body frame 11, by means of fixture pins 29a, 29a.

With the snow removing machine 1 having such a snow removing plate, the electric motor 20 is driven to produce a drive power output which is delivered through the power transmission system 21 to the left and right drive wheels 3,3, with the rotation of the drive wheels 3,3 permitting the left and right crawler belts 5,5 to rotate to render a self-propelled operation.

An operator walks in time to the traveling speed of the snow removing machine 1 while gripping left and right grip portions 70,72 of the handle 60, with the handle 60 being operated to steer the traveling direction or to adjust the height of the snow removing plate 28.

Figure 2:
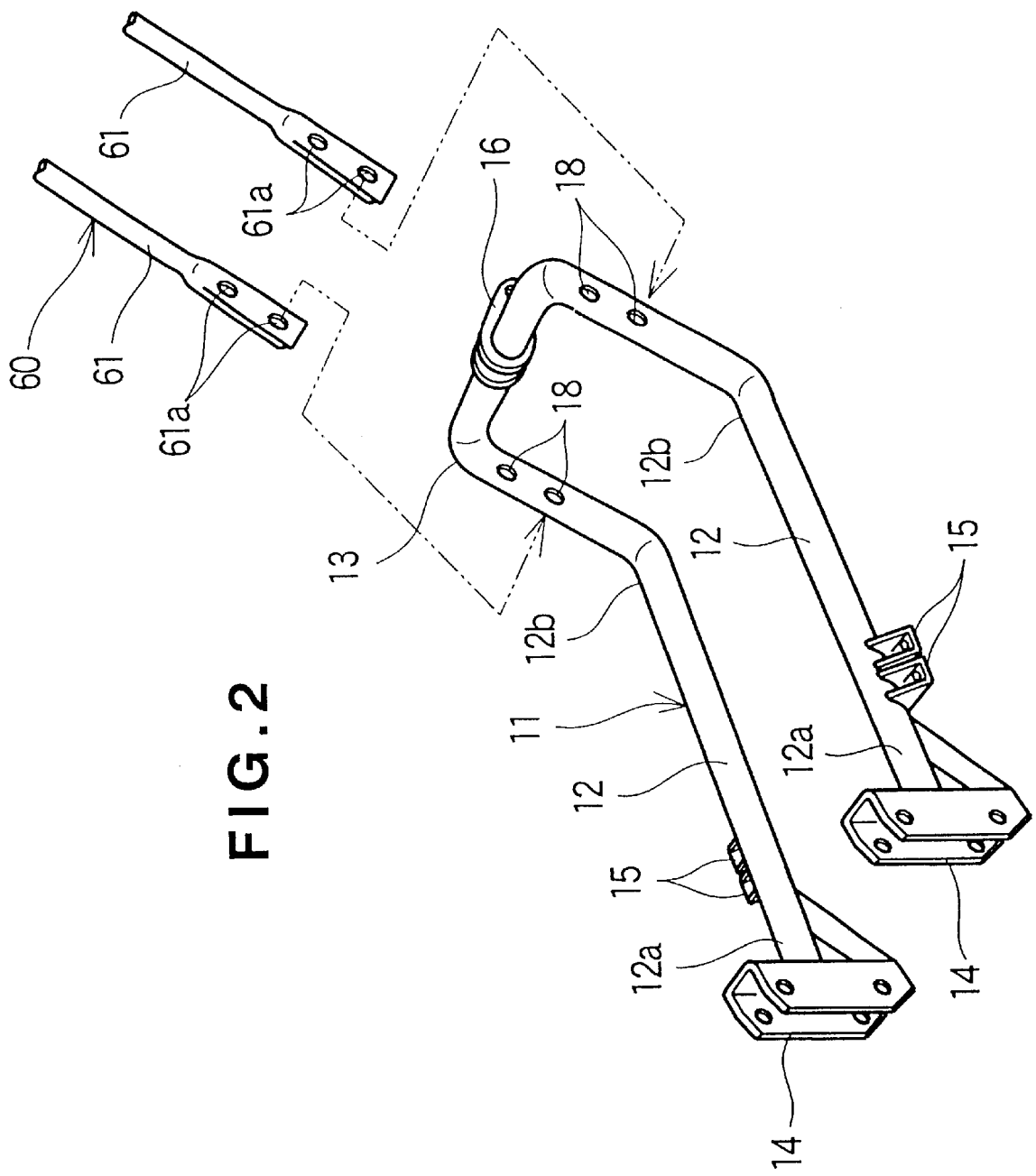
FIG. 2 is a perspective view of a body frame shown in FIG. 1.

FIG. 2 is a perspective view of the body frame 11 of the snow removing machine 1. The body frame 11 includes a pair of horizontal frames 12,12 which are parallel to one another, and a slanted frame 13 which interconnects rear distal ends of respective horizontal frames 12,12 to one another and which extends obliquely rearward and upward. The mounting rackets 14,14, which serve to retain the snow removing plate 28 (see FIG. 1), are connected to front distal ends 12a, 12a of the horizontal frames 12,12, respectively. The horizontal frames 12,12 have plural mounting members 15,15 at positions rearward of the mounting brackets 14,14, respectively, for mounting thereon the electric motor 20 and, the power transmission mechanism 21 (see FIG. 1). An uppermost center of the slanted frame 13 includes a bracket 16 for mounting thereon the height adjustment mechanism 30 (see FIG. 1). The slanted frame 13 has plural mounting bore pairs 18,18 for allowing bolts to be inserted therein to mount tilting tubes 61,61 of the operating handle 60 to the slanted frame 13. Reference numerals 61a, 61a designate bolt insertion bore pairs which are formed in the tilting tubes 61,61, respectively, to allow insertion of bolts during assembly of the slanted tubes 61,61 to the body frame 11. The bolt insertion bore pairs 61a, 61a correspond to the mounting bore pairs 18,18 of the slanted frame 13.

FIG. 3 is a perspective view of the operating handle of the snow removing machine of the first preferred embodiment according to the present invention.

The operating handle 60 includes a U-shaped tube 62 having a substantially U-shaped configuration, as shown in plan view, which is connected to upper distal ends 61b, 61b (of which only one distal end is shown at a front side) of the pair of respective tilting tubes 61,61 by welding. The U-shaped tube 62 has an inwardly extending connecting tube 65. The U-shaped tube 62 has a pair of spaced-apart left and right handle portions or horizontal tubes 63,64 which have rear end portions equipped with the left and right grip portions 70, 72, respectively.

An operation box 67 is mounted between a front end portion 62a of the U-shaped tube 62 and the connecting tube 65. The operation box 67 has the main switch 68 and the maximum speed presetting switch 69. The main switch 68 is a switch for carrying out connection or disconnection between the battery 25 and the electric motor 23 (see FIG. 1). The maximum speed presetting switch 69 is a switch for presetting the maximum speed of the snow removing machine 1.

The left horizontal tube 63 has the speed control lever unit 75 located in the vicinity of the left grip portion 70 for enabling the traveling speed of the snow removing machine 1 to be adjusted.

The right horizontal tube 64 has the forward and aft drive changeover switch 86 located in the vicinity of the right grip portion 72 for changing over the traveling direction of the snow removing machine 1, and the height control lever unit 90 for permitting the height of the snow removing plate 28 (see FIG. 1) to be adjusted.

The speed control lever unit 75 includes a speed control operation lever 78, mounted to a mounting bracket 76 fixedly secured to a lower side of the left horizontal tube 63 via a drive shaft 77, for free swinging movement, the potentiometer 80 coupled to the drive shaft 77 via a drive gear, a driven gear and a driven shaft (not shown), a bracket 83 mounted to the left horizontal tube 63, and a return spring 82 stretched over between the speed control operation lever 78 and the bracket 83. The return spring 82 is composed of a tensioned spring having one distal end 82a coupled to the speed control lever 78 and another distal end 82b coupled to bracket 83, thereby biasing the speed control operation lever 78 in a direction to maintain the same in a neutral position.

When maintained in the neutral position of the speed control operation lever 78, gripping the speed control operation lever 78 in a direction as shown by arrow ① results in rotation of the drive shaft 77 together with the movement of the speed control operation lever 78, thereby allowing the drive gear, the driven gear and the driven shaft (not shown) to be rotated for operating the potentiometer 80. The output signal produced by the potentiometer 80 is applied through a harness 81 to the control unit 25 which is shown in FIG. 1. The rotational speed of the electric motor 20 is adjusted in response to a control signal produced by the control unit 25. Releasing the speed control operation lever 78 causes the speed control operation lever 78 to be returned to the neutral position by the tension of the return spring 82 to allow the potentiometer 80 to be also returned to the neutral position. This results in a stop of the electric motor 20.

When the speed control operation lever 78 is returned to the neutral position, an electromagnetic brake, which is not shown, is actuated in time with the aforementioned operation to provide a braking effect on the drive wheel 3 shown in FIG. 1. When gripping the speed control operation lever 78 in the direction as shown by the arrow ① as discussed above, the potentiometer 80 is actuated while releasing the brake to drive the drive wheels 3,3.

The forward and aft drive changeover switch 86 is mounted in the vicinity of the right grip portion 72 by means of a mounting plate 87. The forward and aft drive changeover switch 86 is electrically connected through a harness 88 to the control unit 25, which is shown in FIG. 1, and includes an operation knob 86a for enabling changeover between a forward drive position and an aft drive position. A rear end portion of the operation knob 86a includes a protruding ridge which extends along the right grip portion 72. Such a structure allows a thumb or forefinger of a right hand, which grips the right grip portion 72, to be brought into engagement with the protruding ridge for thereby permitting the operation knob 86a to be changed over between the forward drive position and the aft drive position. The mounting plate 87 includes an arch-shaped segment 87a mounted to an outer circumferential periphery of the right horizontal tube 64, and a horizontal segment 87b which is oriented from an upper edge of the arch-shaped segment 87a and horizontally extends inward. The forward and aft drive changeover switch 86 is mounted on the horizontal segment 87b.

With the structure of the forward and aft drive changeover switch 86, operating the operation knob 86a in a direction as shown by arrow ② with the right hand's thumb or forefinger of the operator allows the operation knob 86a to be changed over between the forward and aft drive positions for thereby permitting the electric motor 20 (see FIG. 1) to be driven in a forward or reverse direction in response to the output signal produced by the control unit 25.

The height control lever unit 90 includes a mounting bracket 91 fixedly secured to a lower side of the mounting plate 87, an operation lever 93 mounted to the mounting bracket 91 for free swinging movement by means of a pin 92, and a wire 95 having its distal end 95a connected to the operation lever 93 by means of a pin 94. The height control lever unit 90 allows the operator's right hand to lay on the right grip portion 72 to permit the fingers to grip the grip the operation lever 93 in a direction as shown by an arrow ③ with an adjustable gripping force.

Figure 4:
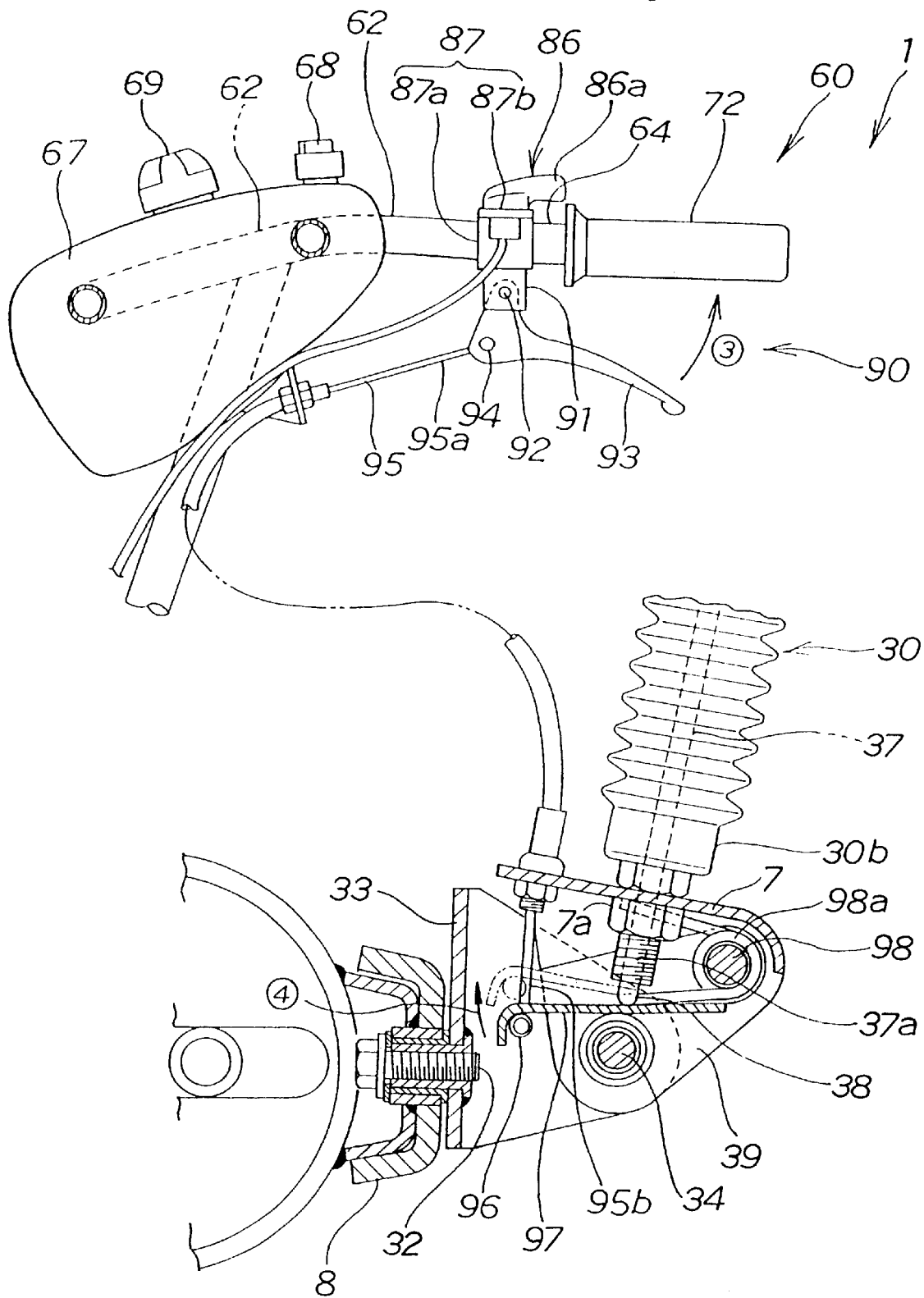
FIG. 4 is a schematic view illustrating a relationship between a peripheral circumference of the operating handle and a height adjustment mechanism shown in FIG. 3.

FIG. 4 shows a relationship between the height adjustment mechanism 30 and the height control lever unit 90. Another distal end 95b of the wire 95, whose one distal end 95a is connected to the operation lever 93, is connected to a swing plate or an operation plate 97 by means of a pin 96.

Gripping the operation lever 93 as shown by the arrow ③ allows the height adjustment mechanism 30 to be actuated. The height adjustment mechanism 30 is constructed having an upper distal end 30a mounted to an upper bracket 16, which is located at an upper portion of the body frame 11 as shown in FIG. 1, by means of a pin 17, and a lower distal end 30b mounted to the cross member 8.

When mounting the lower distal end 30b of the height adjustment mechanism 30 to the cross member 8, a first bracket 33 is first mounted to the cross member 8 at a widthwise, central position thereof with a fixture bolt 32 for freely rotatable movement in a forward or reverse direction and a second bracket 39 is then rotatably mounted to the first bracket 33 by means of a first pivot pin 34. Subsequently, a lower end portion 37a of a piston rod 37 of the height adjustment mechanism 30 is screwed into and mounted to the second bracket 39 such that a lower distal end 30b of the height adjustment mechanism 30 is mounted to the cross member 8 for swinging movement in upward or downward direction or in left and right direction.

A base end portion of the operation plate 97 is mounted to the second bracket 39 by means of a second pivot pin 98 for swinging movement in an upward or downward direction. A lower distal end of the push rod 38, which protrudes downward from the lower end portion 37a, is brought into abutting engagement with the operation plate 97, which is urged downward by the action of a return spring 98a. The operation plate 97 is maintained at a stationary condition in abutting engagement with the first pivot pin 34.

Now, the operation of the height control lever unit 90 for the snow removing plate 28 will be discussed below.

Operating the operation lever 93 of the height control lever unit 90 toward the right grip portion 72 in the direction of the arrow ③ allows the wire 95 to be tensioned. When the wire 95 is tensioned, the operation plate 97 is shifted in a direction as shown by an arrow ④ against the force of the return spring 98a, causing a push rod 38 of the height adjustment mechanism 30 to be lifted up. This allows high pressure gas to pass between upper and lower spaces of a cylinder of the high adjustment mechanism 30 in a manner described below.

Under such a condition, when the operator lifts up the left and right grip portions 70,72 (of which only the right grip portion 72 is shown), the height adjustment mechanism 30 is extended to allow the body frame 11 to swing upward about the drive wheel shaft 3a (see FIG. 1). Consequently, the snow removing plate 28 (see FIG. 1) is brought into a lowered condition.

When the left and right grip portions 70,72 are lowered by the operator, the height adjustment mechanism 30 is retracted to allow the body frame 11 to swing downward about the center of the drive wheel shaft 3a. This causes the snow removing plate 28 to move upward.

In this manner, the raising or lowering of the left and right grip portions 70,72 while operating the operation lever 93 allows the height of the snow removing plate 28 (see FIG. 1) to be adjusted.

When the operation lever 93 is returned to its original position, the high pressure gas in the cylinder of the height adjustment mechanism 30 is disenabled to pass between upper and lower spaces of the piston. This allows the body frame 11 (see FIG. 1) to be obstructed from swinging upward or downward to maintain the snow removing plate 28 at a fixed height.

Figure 5:
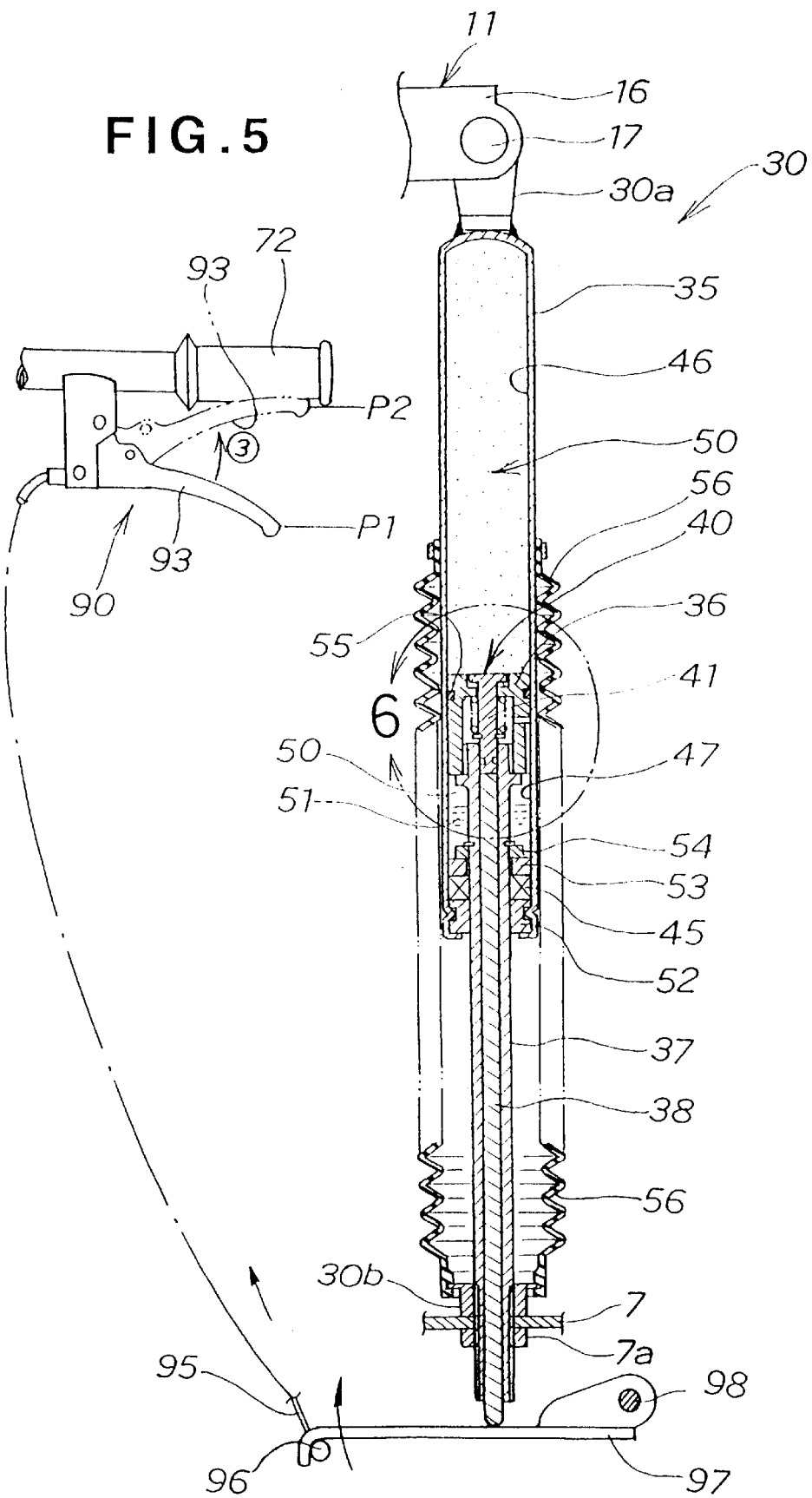
FIG. 5 is a sectional view of the height adjustment mechanism shown in FIG. 4.

FIG. 5 is a cross sectional view of the height adjustment mechanism 30 remaining in its maximum, extended length.

As previously discussed above, the upper distal end 30a of the height adjustment mechanism 30 is connected to the upper bracket 16 of the body frame 11 by means of the pin 17, with the lower distal end 30b being connected to the lower bracket 7 (see FIG. 1) of the traveling frame 6 shown in FIG. 1. Reference numeral 7a designates a nut.

The height adjustment mechanism 30 includes a cylinder 35 having it upper end which is closed, a cylindrical piston 36 received in the cylinder 35 for reciprocating movement, the tubular piston rod 37 coupled to and extending downward from the piston 36, the push rod 38 received in the piston rod 37 for reciprocating movement, and a control valve 40 which is driven to be opened or closed with the push rod 38. Reference numerals 52, 53, 54, 55 and 56 designate a sliding bearing, a cylinder side stopper, a piston-rod side stopper, an O-ring and a boot, respectively.

Figure 6:
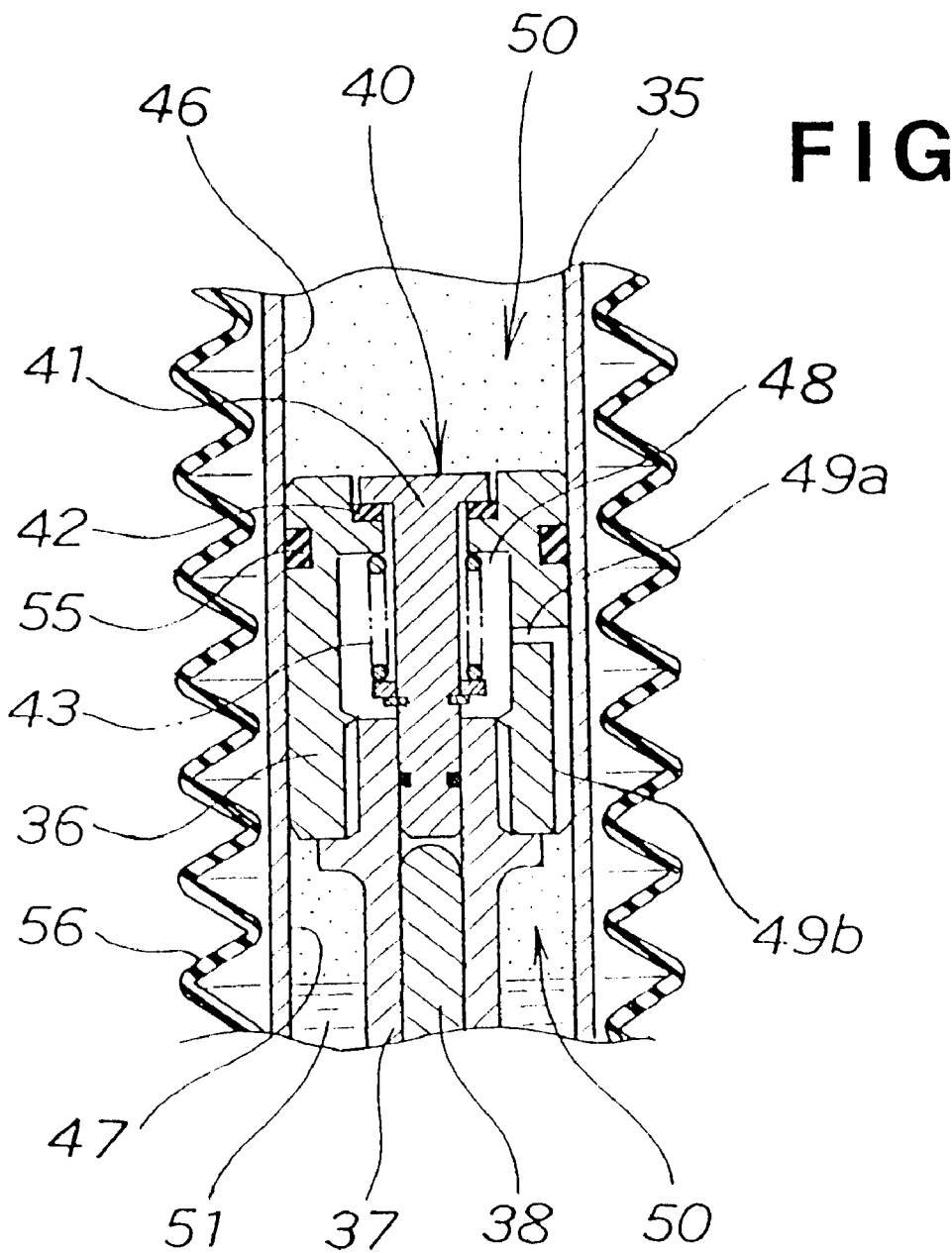
FIG. 6 is an enlarged cross sectional view showing a circled portion 6 of FIG. 5.

FIG. 6 is an enlarged cross sectional view of a circled section 6 shown in FIG. 5 for illustrating the piston 36 and the control valve 40.

The control valve 40 includes a valve body 41 which is driven in the piston 36 by the push rod 38 for upward or downward movement, a valve seat 42 formed on an upper end of the piston 36 to be opened or closed owing to the upward or downward movement of the valve body 41, and a compression spring 43 which urges the valve body 41 in a direction to close the valve seat 42 at a normal time.

Closing a lower distal end of the cylinder 35 with an oil seal 45 shown in FIG. 5 allows the piston 36 to bisect an internal space of the cylinder 35 from an upper chamber 46 to a lower chamber 47. When opening the control valve 40, the upper chamber 46 and the lower chamber 47 communicate with one another via an air space 48 defined in the piston 36 and flow passages 49a, 49b. In this event, the upper chamber 46 and the lower chamber 47 are filled with the high pressure gas 50. A lower portion of the lower chamber 47 is also filled with oil 50.

Now, the operation of the.height adjustment mechanism 30 is described below with reference to FIG. 5.

When the operation lever 93 remains in a fixed position P1 as shown by a solid line, the control valve 40 remains in a closed condition (see FIG. 6). In this event, the high pressure gas 50 is disenabled to pass between the upper chamber 46 and the lower chamber 47, thereby maintaining the piston 36 in its stationary condition. Consequently, the height adjustment mechanism 30 is held in a non-operative condition for retaining the snow removing plate 28, which is shown in FIG. 1, at a predefined height.

Next, the operation lever 93 of the height adjustment mechanism 30 is gripped such that it is dislocated from the fixed position P1 to the releasing position P2. This causes the wire 95 to be pulled such that the pin 96 of the lower distal end of the wire 95 is lifted up to move the swing plate 95 upward against the force of the return spring (see FIG. 4). The swing arm 97 is caused to swing upward about the center of the second pivot pin 98 for raising the push rod 38.

When opening the control valve 40 by moving the valve body 41 upward with the push rod 38, the upper chamber 46 and the lower chamber 47 are brought into communication with one another. When this occurs, the high pressure gas 50 is enabled to pass between the upper chamber 46 and the lower chamber 47 for permitting the piston 36 to move upward or downward. Accordingly, the height adjustment mechanism 30 is brought into the free condition to allow the snow removing plate 28, which is shown in FIG. 1, to be moved upward or downward.

According to such a height adjustment mechanism 30, the presence of the high pressure gas 30 filled in the cylinder 35 allows the control valve 40, when it is opened, to easily pass the high pressure gas through the flow passages. For example, as compared to a case wherein oil is filled in the cylinder 30, the high pressure gas renders the piston 36 to be smoothly moved. In addition, when the control valve 40 is held in the closed condition, the presence of a compressive action of the high pressure gas 50 restricts the snow removing machine from being subjected to impacts or vibrations from the road surface or snow surface.

Now, the relationship between the operation of the speed control lever unit 75 and the height control lever unit 90 and the movement of the snow removing machine 1 is described below with reference to FIGS. 7A to 8B.

Figure 7A:
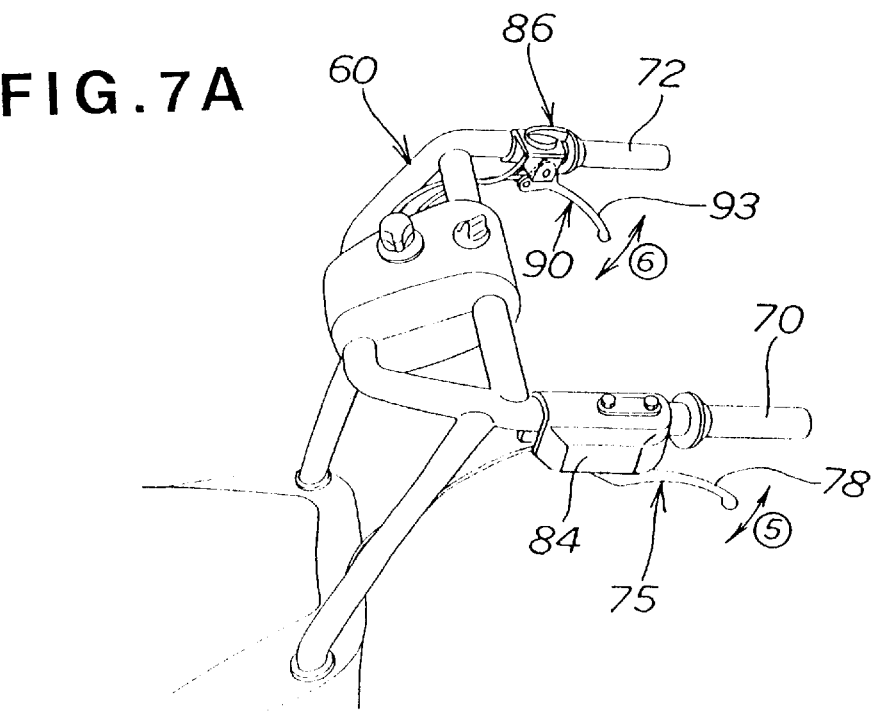
FIGS. 7A and 7B are views illustrating an operation process for adjusting the height of a snow removing plate of the snow removing machine of the first preferred embodiment, FIG. 7A showing in perspective the operating handle and FIG. 7B showing in side elevation the snow removing machine.

In FIG. 7A, the operator first grips the left grip portion 70 with his left hand, by which the operation lever 78 of the speed control unit 75 is operated as shown by an arrow ⑤, while gripping the right grip portion 72 with his right hand by which the operation lever 93 of the height control lever unit 90 is operated as shown by an arrow ⑥. Consequently, during the operations of the speed control lever unit 75 and the height control lever unit 90, it is possible to prevent the operating handle 60 from being operated with a single hand.

Figure 7B:
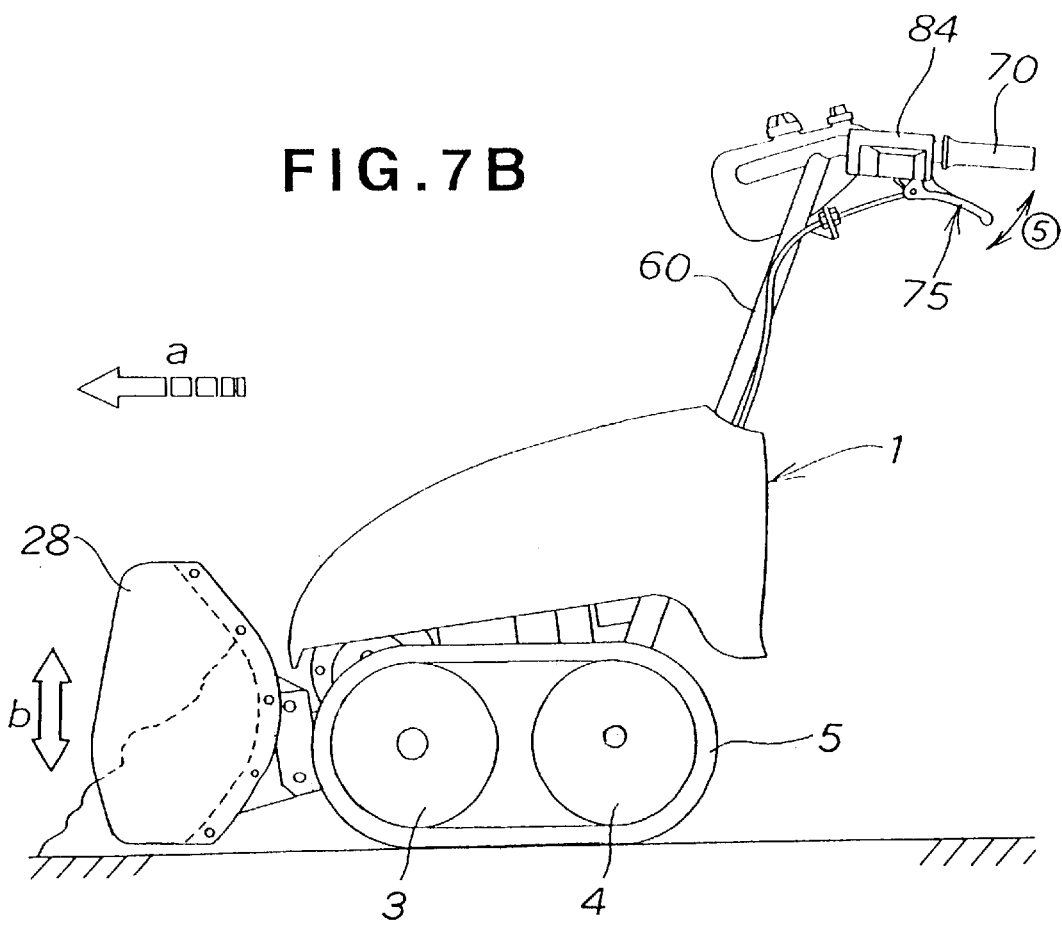

In FIG. 7B, the operator walks as he changes the traveling speed of the snow removing machine 1 as shown by an arrow a in accordance with a working condition while allowing the snow removing plate 28 to be raised or lowered as shown by an arrow b for thereby adjusting the height of the snow removing plate 28.

In such a manner, as shown in FIG. 7A, it is possible for the operator to operate the height control lever unit 90 with his right hand while operating the speed control lever unit 75 with his left hand as he grips the left and right grip portions 70,72 with his left and right hands. Accordingly, since the operator is enabled to operate the operating handle with his both hands without operating with his single hand, it is possible to lighten the operator's work load. In addition, since it is unnecessary for the operator to interrupt the snow removing work once, a snow removing work efficiency is highly improved.

Figure 8A:
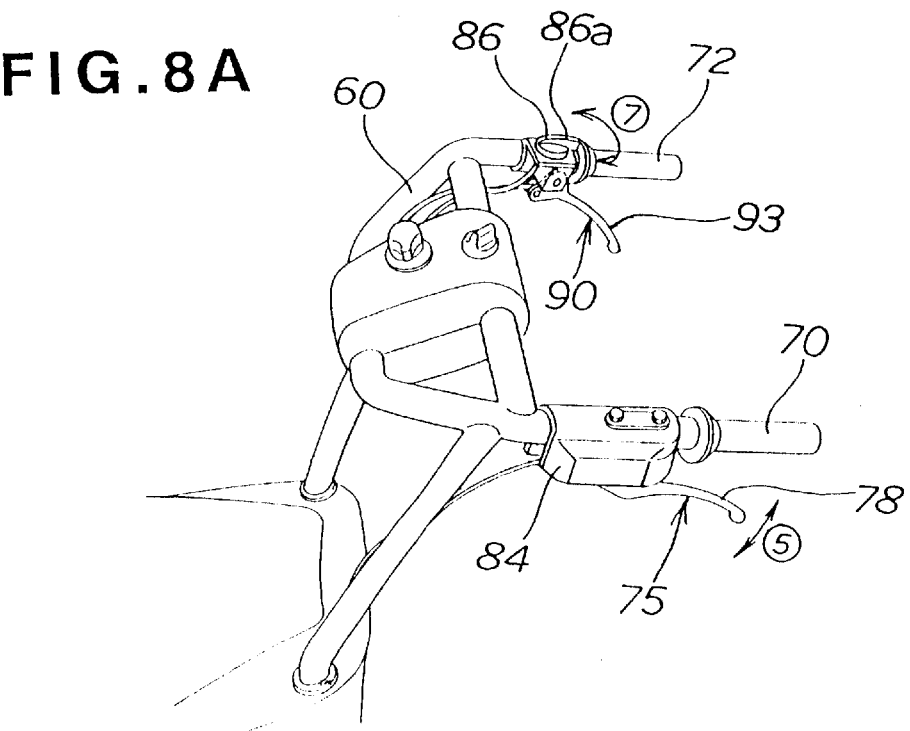
FIGS. 8A and 8B are views illustrating operating processes for a vehicle speed and a traveling direction of the snow removing machine of the first preferred embodiment, FIG. 8A showing in perspective the operating handle and FIG. 8B showing in side elevation the snow removing machine.

In FIG. 8A, under a condition wherein the operator grips the left grip portion 70 with his left hand, the operator operates the operation lever 78 of the speed control lever unit 75 as shown by the arrow ⑤. Concurrently, under a condition wherein the operator's right hand grips the right grip portion 72, the right hand's thumb or forefinger is allowed to operate the operation knob 86a of the forward and aft drive changeover switch 86 as shown by an arrow ⑦. Accordingly, during the operation of the speed control lever unit 75 and the forward and aft drive changeover switch 86, the operation of the operating handle 60 with the single hand is avoided to enable the operating handle 60 to be operated with the both hands of the operator.

Figure 8B:
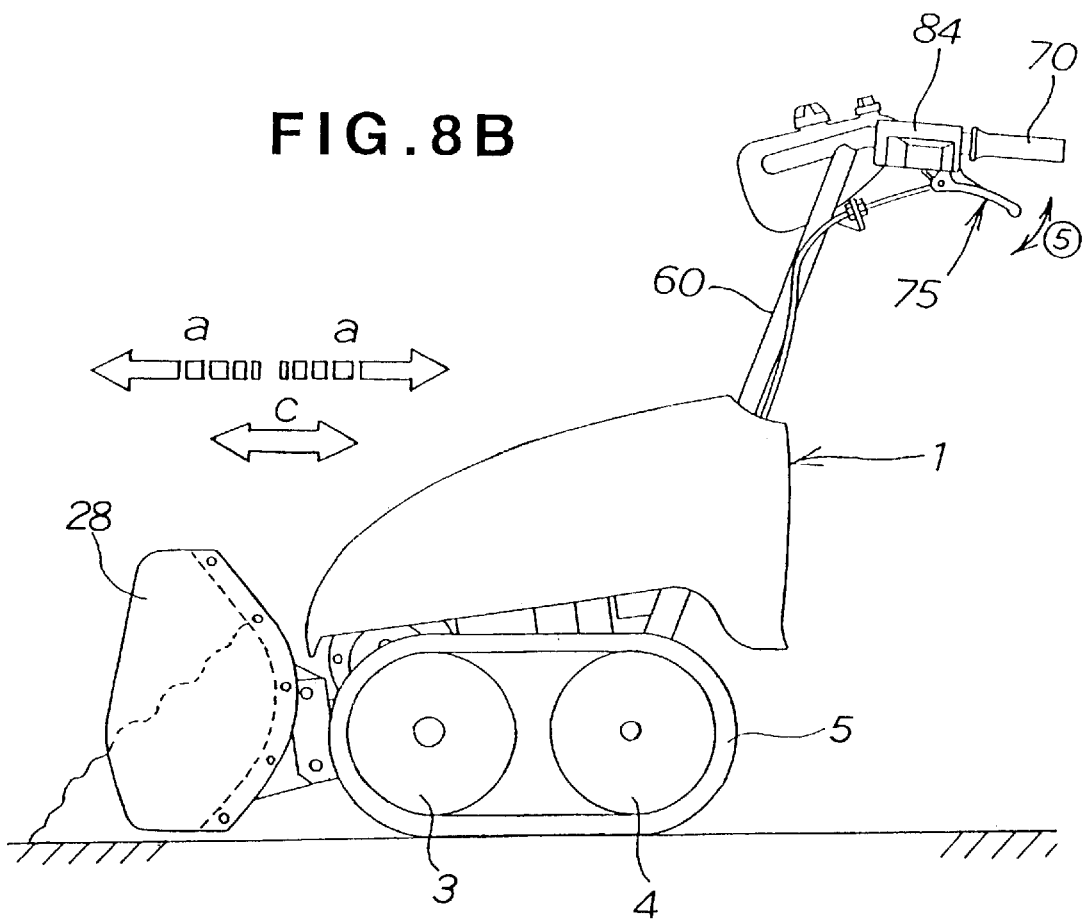

In FIG. 8B, the operator is enabled to vary the traveling speed as shown by the arrow a while changing over the traveling direction of the snow removing machine 1, which is equipped with the snow removing plate, in the forward or aft drive directions as shown by the arrow c in dependence on the snow removing work condition.

In such a manner, as shown in FIG. 8A, it is possible for the operator to manipulate the forward and aft drive changeover switch 86 with the right hand while manipulating the speed control lever unit 75 with the left hand under a condition wherein the operator grips the left and right grip portions 70,72 with his both hands. Accordingly, it is possible for the operator to manipulate the operating handle 60 with both hands without manipulating the operating hand 60 with the single hand for thereby lightening the operator's work load. In addition, since it is unnecessary for the operator to interrupt the snow removing work once, a snow removing work efficiency is highly improved.

In the first preferred embodiment discussed above, although the present invention has been shown and described as including the speed control lever unit 75 mounted on the left grip portion 70, and the forward and aft drive changeover switch 86 and the height control lever unit 90, which adjusts the height of the snow removing plate 28, both of which are mounted on the right grip portion 72, the left grip portion 70 may carry the forward and aft drive changeover switch 86 and the height control lever unit 90, and the right grip portion 72 may carry the speed control lever unit 75, resulting in a similar effect.

Next, a second preferred embodiment of a snow removing machine employing a lever lock mechanism 100 combined with the height control lever unit 90 will be described below with reference to FIGS. 9 to 11.

Figure 9:
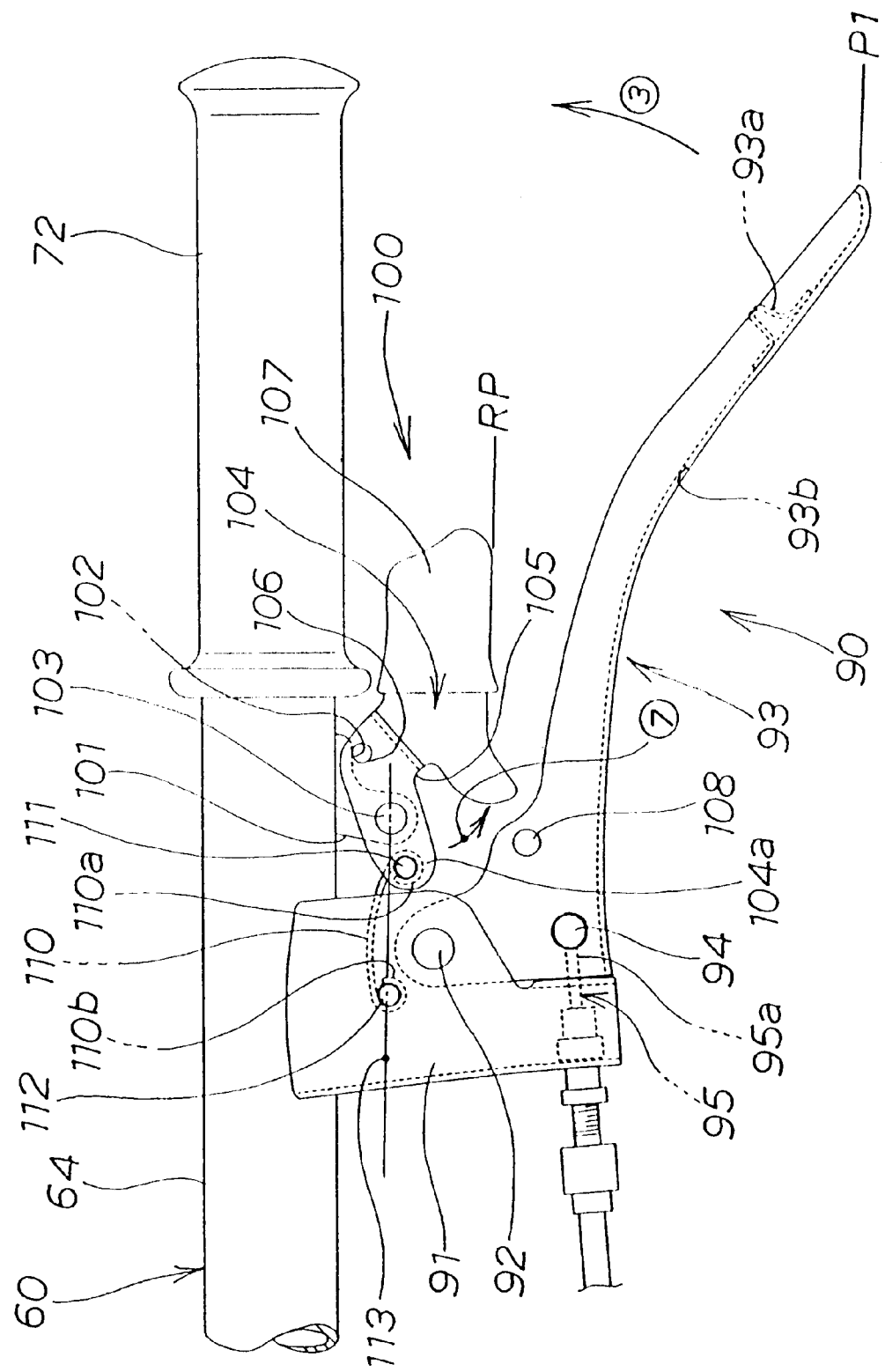
FIG. 9 is an enlarged view showing a right handle portion of a snow removing machine, having a lever lock mechanism, according to a second preferred embodiment of the present invention.

In FIG. 9, the height control lever unit 90 has the mounting bracket 91 to which the operation lever 93 is mounted by means of the pin 92, with the operation lever 93 having a pin 94 to which the distal end 95a of the wire 95 is connected. The operation lever 93 is retained in a fixed position P1 by the action of the return spring (not shown).

The height control lever unit 90 allows the operator to manipulate the operation lever 93 with a finger of his right hand in a direction as shown by the arrow ③ from the fixed position P1 under a condition wherein the operator grips the right grip portion 72 with his right hand. A rear end portion of the operation lever 93 has a stopper segment 93a, with a substantially central portion of the operation lever 93 having an opening 93b (see FIGS. 10A and 10B). The stopper segment 93a serves as a positioning member which when the operator grips the operation lever 93, it is brought to into abutting engagement with the right grip portion 72 to allow the operation lever 93 to be positioned in the releasing position P2 (see FIGS. 10A and 10B). The opening 93b is formed in an aperture to pass a lever segment 104 which will be described below.

The lever lock mechanism 100 includes a bracket 101 fixed to the handle 60 (in particular, to the right horizontal tube 64), a lever segment 104 swingably mounted to the bracket 101 by means of a pivot pin 103 and having a lock recess 105, a spring member (a leaf spring) 110 which retains the lever segment 104 in a lock position LP (see FIG. 10B) or a releasing position RP, and a lock pin 108 fixed to the operation lever 93 to be guided in the lock recess 105 under a condition wherein the lever segment 104 is retained in the releasing position RP.

A central portion of the lever segment 104 has a stopper pin 106, which is brought into abutting engagement with the stopper segment 102 to be retained in the releasing position RP. A rear end portion of the lever segment 104 is concealed with a cover 107.

One distal end 110a of the leaf spring 110 is wound around a first pin 111, with the other distal end 110b being wound around a second pin 112 to be mounted to the mounting bracket 91 and to be formed in an arch-shaped configuration.

The first pin 111 is located at a position below a linear line 113 intersecting between the second pin 112 and the pivot pin 103. This allows the lever segment 104 to be exerted with a spring force of the leaf spring 110 such that the lever segment 104 is urged so as to be rotated in the direction as shown by an arrow ④ around a center of the pivot pin 103. For this reason, the stopper pin 106 of the lever segment 104 is held in abutting engagement with the stopper segment 102 of the bracket 101 to retain the lever segment 104 in the releasing position RP.

The lever lock mechanism 100 is located in a relatively small space between the right horizontal tube. 64 and the height control lever unit 90. As a consequence, it is unnecessary to provide a large space for mounting the lever lock mechanism 100, with a resultant increase in freedom in design concept. In addition, the lever lock mechanism 100 may comprises three essential component parts such as the lever segment 104, the leaf spring 110 and the lock pin 108, resulting in a compact structure with a reduced cost.

Now, the operation of the lock lever mechanism 100 is described with reference to FIGS. 9 to 11.

Figure 10A:
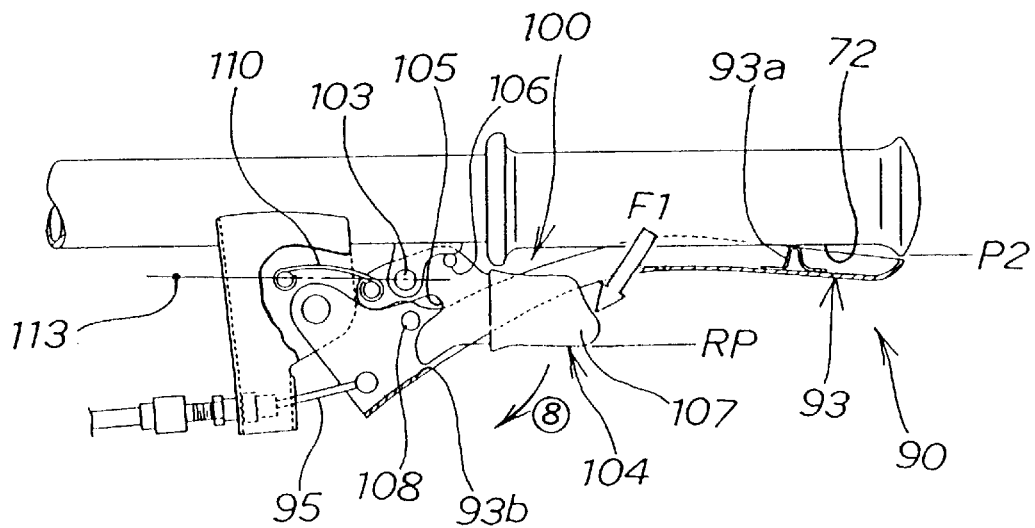
FIGS. 10A and 10B are views for illustrating the principles of operation of a lever lock mechanism and an operation lever shown in FIG. 9.
Figure 11:
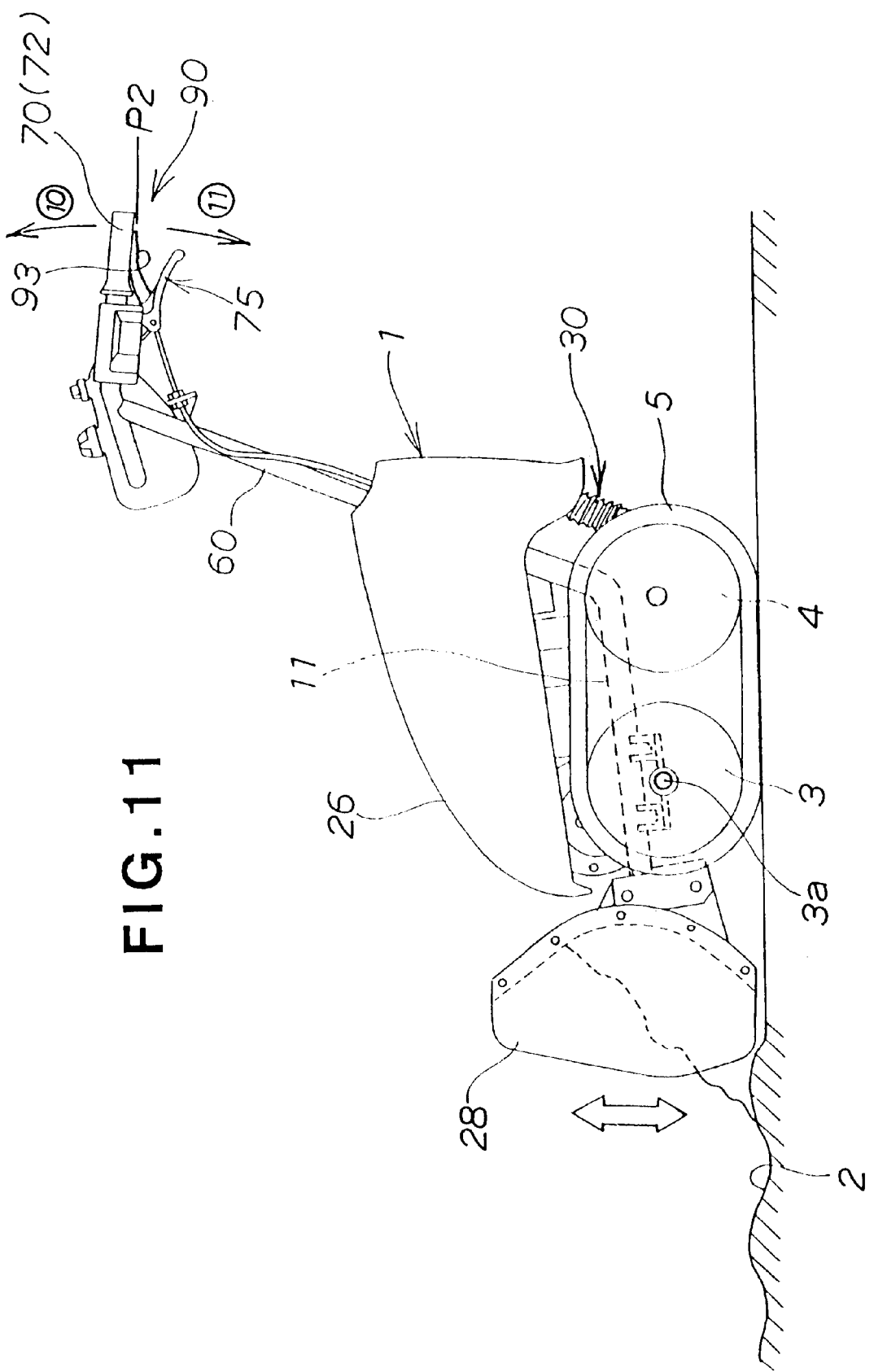
FIG. 11 is a side elevational view illustrating an operation of a snow removing machine according to the second preferred embodiment of the present invention.

In FIG. 10A, gripping the operation lever 93 and manipulating the same as shown by the arrow ③ causes the stopper segment 93a of the operation lever 93 to be brought into abutting engagement with the right grip portion 72. In this manner, the operation lever 93 is shifted from the fixed position P1 (see FIG. 9) to the releasing position RP at which the operation lever 93 is held stationary.

The presence of the leaf spring 110, which retains the lever segment 104 in the releasing position RP, allows the lock pin 108 of the operation lever 93 to enter the lock recess 105. Concurrently, the lever segment 104 is caused to enter the opening 93b.

Shifting the operation lever 93 from the fixed position P1 (see FIG. 9) to the releasing position RP causes the wire 95 to be pulled. Accordingly, the swing arm 97 shown in FIG. 5 is allowed to swing upward against the force of the return spring for thereby lifting up the push rod 38. As a result, the control valve 40 is opened to communicate the upper chamber 46 and the lower chamber 47 with one another to render the height adjustment mechanism 30 to be brought into the free condition.

Next, gripping the operation lever 93 and manipulating the same with, for example, the right hand's thumb allows the cover 107 of the lever segment 104 to be exerted with a downward force F1. The lever segment 104 is then caused to swing in a direction as shown by an arrow ⑧ about an axis of the pivot pin 103 against the force of the leaf spring 110.

Figure 10B:
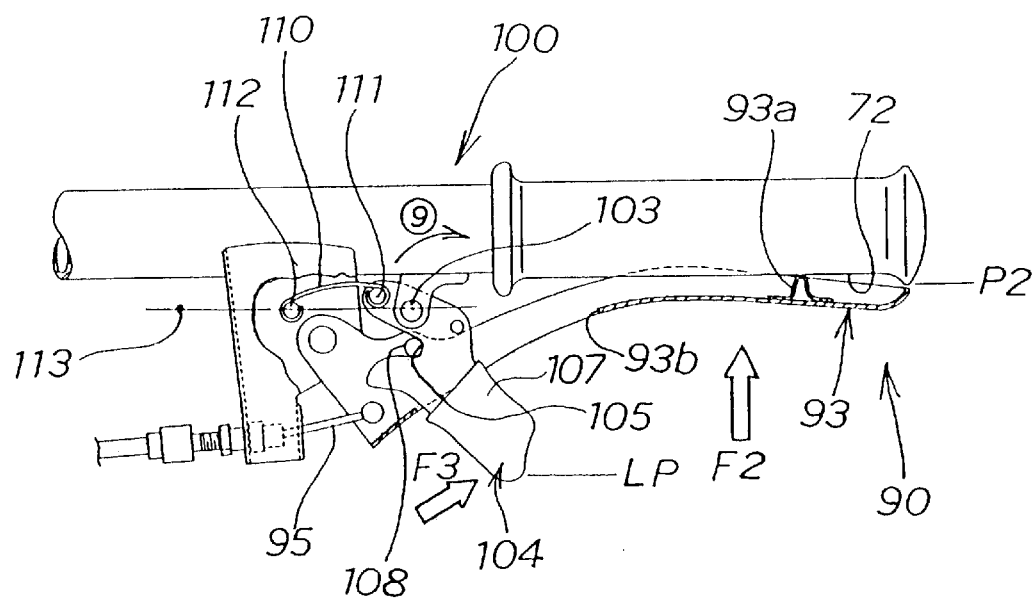

In FIG. 10B, the lever segment 104 is rotated to the lock position LP. In this instance, the first pin 111 is located above the linear line 113 intersecting the second pin 112 and the pivot pin 103. Then, the lever segment 104 is exerted with the spring force of the leaf spring 110 such that the lever segment 104 is urged in the direction to rotate as shown by an arrow ⑨ around the pivot pin 103. As a result, the lock pin 108 of the operation lever 93 is forced to enter the lock recess 105 of the lever segment 104. That is, the lock pin 108 meshes with a portion which forms a part of the lock recess 105, thereby retaining the lever segment 104 in the lock position LP. This prevents the lock pin 108 from slipping out from the lock recess 105 for thereby retaining the operation lever 93 in the releasing position P2. Accordingly, even when the operator releases his hand from the operation lever 93, the operation lever 93 can be retained in the releasing position P2. Under such a condition, the upward or downward movements of the grip portion 72 allow the height of the snow removing plate 28 (see FIG. 1) to be effectively adjusted. For example, when is desired to lower the snow removing plate 28, the grip portion 72 needs to be lifted up. Lift up of the grip portion 72 while gripping the operation lever 93 causes the operation lever 93 to be exerted with the upward force F2. However, the presence of the stopper segment 93a of the operation lever 93 allows the operation lever 93 to be held stationary at the releasing position P2. Thus, the lock pin 108 is held stationary such that even when the operation lever 93 is imparted with the force F2, the operation lever 93 is not released from the lock condition.

Now, the operation of the snow removing plate 28 for its downward or upward movements is described with reference to FIG. 11. The operation lever 93 is retained in the releasing position P2 with the lever lock mechanism 100 shown in FIG. 10B and, under such a condition, the left and right grip portions 70 and 72 are lifted up as shown by an arrow ⑩. This causes the body frame 11 to swing about the axis of the drive wheel shaft 3a in a counterclockwise direction, thereby lowering the snow removing plate 28.

Next, an explanation is given to a case wherein the snow removing plate 28 is raised. The operation lever 93 is retained in the releasing position P2 with the lever lock mechanism 100 shown in FIG. 10B and, under such a condition, the left and right grip portions 70 and 72 are lowered as shown by an arrow ⑪. This causes the body frame 11 to swing about the axis of the drive wheel shaft 3a in a clockwise direction, thereby raising the snow removing plate 28.

Further, the releasing operation of the lever lock mechanism 100 is described below. In FIG. 10B, the operation lever 93 is gripped with the operator's right hand and, under such a condition, the cover 107 of the lever segment 104 is imparted with a lift up force F3 with, for example, the operator's forefinger. This causes the lever segment 104 to rotate about the axis of the pivot pin 103 in the counter-clockwise direction against the force of the leaf spring 110 such that the lever segment 104 is readily returned to the releasing position RP shown in FIG. 10A. Under such a condition, when the operator releases his right hand from the operation lever 93 of the height control lever unit 90, the operation lever 93 is returned to the fixed position P1 (see FIG. 9) responsive to the spring force of the return spring 98a (see FIG. 4).

Returning of the operation lever 93 to the fixed position P1 causes the swing arm 97, which is shown in FIG. 5, to swing downward responsive to the spring force of the return spring 98a (see FIG. 4), thereby rendering the downward movement of the push rod 38 to close the control valve 40 again. As a result, the high pressure gas 50 is disenabled to pass between the upper chamber 46 and the lower chamber 47 for thereby retaining the snow removing plate 28 at a given position.

In accordance with the snow removing machine 1 of the second preferred embodiment discussed above, the lever lock mechanism 100 mounted to the handle 60 (the right horizontal tube 64) functions to lock the operation lever 93 in the greatest, gripped position. For this reason, during upward or downward movements of the handle 60, i.e., the left and right grip portions 70 and 72 for adjusting the height of the snow removing plate 28 depending on irregular surfaces or undulations of the snow surface 2, it is needless to manipulates the operation lever 93 because it is held in the locked condition. Thus, a mere manipulation is required for the operator to perform upward or downward movements of the grip portions 70,72, with a resultant decrease in the operator's work load.

During such an upward or downward movement of the grip portions 70,72, since it is needless to manipulate the operation lever 93, it is possible for the operator to concentrate in the manipulation of only the upward or downward movement of the grip portions 70,72 to allow the grip portions 70,72 to move upward or downward in a smooth fashion for thereby improving the snow removing work efficiency.

In accordance with the snow removing machine 1 of the second preferred embodiment, further, merely swinging the lever segment 104 of the lever lock mechanism 100 enables the lock recess 105 and the lock pin 108 to mesh each other. A simple manipulation of the lever segment 104 for swinging movement required for the operator renders the operation lever 93 to be locked in the gripped position.

Next, structures of a height control lever unit 120 and a lever lock mechanism 130 of a third preferred embodiment are described with reference to FIG. 12.

In FIG. 12, the height control lever unit 120 is constructed having a mounting bracket 91 to which an operation lever 123 is mounted by means of a pin 94 for free swinging movement, with one distal end 95a of a wire 95 is connected to the operation lever 123 by means of a pin 94. The height control lever unit 120 is operated such that under a condition wherein the operator grips the right grip portion 72 with his right hand, the operation lever 123 is manipulated with the right hand's finger as shown by the arrow a.

The lever lock mechanism 130 includes a bracket 131 fixed to the handle 60 (in particular, to the right horizontal tube 64), a lever segment 134 swingably mounted to the bracket 131 by means of a pivot pin 133, a spring member (a twisted spring) 140 which retains the lever segment 134 in a releasing position RP, and a lock pin 138 fixed to the lever segment 134 to mesh with the lock recess 135 formed in the operation lever 123 under a condition wherein the operation lever 123 is held stationary in the releasing position P2 (see FIG. 13).

A front distal end of the lever segment 134 has a first stopper segment 136, which is brought into abutting engagement with the second stopper segment 132 to locate the lever segment 134 in the releasing position RP. During manipulation of the operation lever 123 with the right hand as shown by the arrow a, the lever segment 134 may be manipulated with the right hand's finger as shown by the arrow b.

The twisted spring 140 is mounted to the pivot pin 133. One distal end of the twisted spring 140 engages with a first pin 131a of the bracket 131, with the other distal end engaging with a second pin 134a of the lever segment 134. The twisted spring 140 is urged in a clockwise direction, thereby holding the lever segment 134 stationary in the releasing position RP.

As previously described above, the lever lock mechanism 130 is constructed of three essential component parts, i.e., the lever segment 134, the twisted spring 140 and the lock pin 138, with a resultant compact structure in the lever lock mechanism 130 with a low cost.

Now, the related operation between the lever lock mechanism 130 and the operation lever 123 of the third preferred embodiment is described below with reference to FIGS. 12 to 13C.

After gripping the right grip portion 72 together with the operation lever 123 and manipulating the same as shown by the arrow a, the lever segment 134 is manipulated with the operator's finger as shown by the arrow b.

Figure 13A:
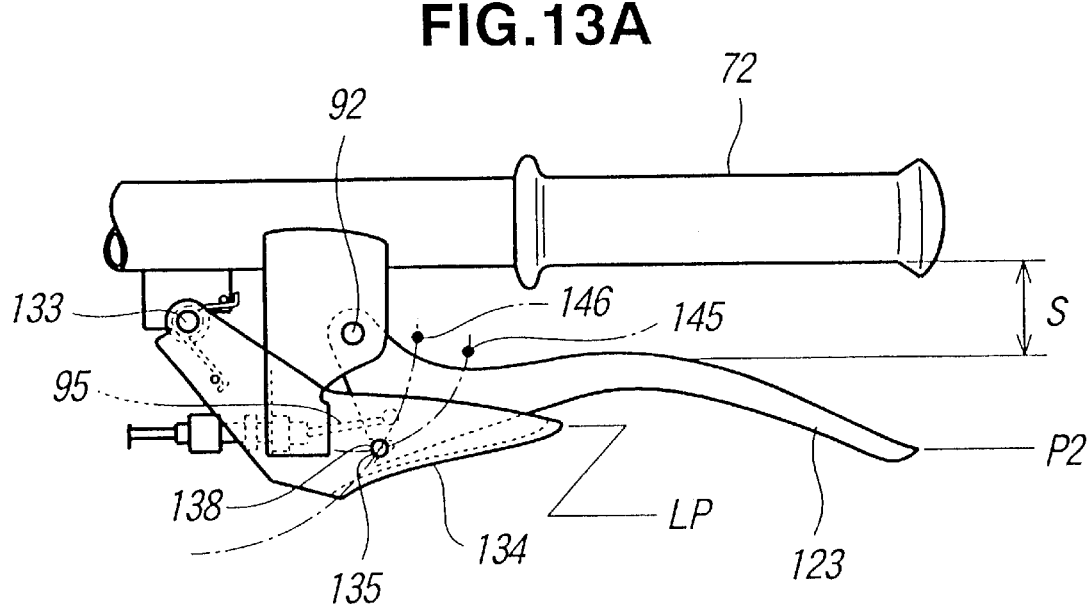
FIGS. 13A to 13C are schematic views illustrating the principles of operation of a lever lock mechanism and an operating lever of the snow removing machine according to the second preferred embodiment shown in FIG. 12.

In FIG. 13A, when the operation lever 123 is shifted to the releasing position P2 and the lever segment 134 reaches the lock position LP, the lock pin 138 of the lever segment 134 is brought into engagement with the lock recess 135 of the operation lever 123. The lock recess 135 moves along a first circle segment 145 about the axis of the pin 92, and the lock pin 138 moves along a second circle segment 146 about the axis of the pivot pin 133. However, since the lock pin 138 is held in engagement with the lock recess 135, the downward movement of the lock recess 135 is restricted with the lock pin 138, and the downward movement of the lock pin 138 is restricted with the lock recess 135. Consequently, the operation lever 123 is held stationary at the releasing position P2, and the lever segment 134 is held stationary at the lock position LP, provided that when the operation lever 123 is further deeply gripped from the releasing position P2 of the operation lever 123, the lock pin 138 disengages from the lock recess 135 to allow the operation lever 123 to rotate about the axis of the pin 92 in the counterclockwise direction.

As a result, as in the second preferred embodiment, when the swing arm 97 (see FIG. 5) is pulled upward with the wire 95, the swing arm 97 swings upward about the axis of the pivot pin 98 for thereby lifting up the push rod 38. Then, the control valve 40 is opened to allow the upper chamber 46 and the lower chamber 47 to communicate with each other to bring the height adjustment mechanism 30 into the free condition. Further, under a circumstance wherein the operation lever 123 is held stationary at the releasing position P2, there exists a given space S between the operation lever 123 and the right grip portion 72. This space S is determined to have a value to allow the entry of the operator's fingers.

Figure 13B:
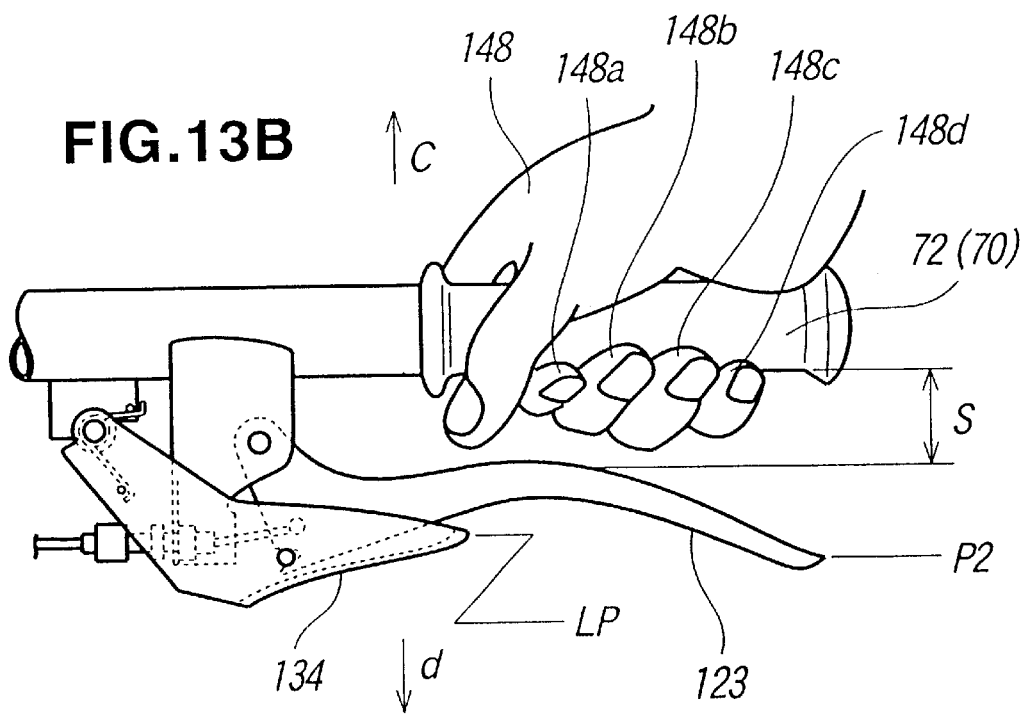

As seen in FIG. 13B, the fingers 148a to 148d of the right hand 148 are released from the operation lever 123 and, subsequently, the right grip portion 72 is gripped with the fingers 148a to 148d located in the space S. Under such a condition, the left and right grip portions 70,72 are lifted upward as shown by the arrow c and the snow removing plate 28 (see FIG. 11) is lowered. The downward movements of the left and right grip portions 70,72 in the direction as shown by the arrow d permits the snow removing plate 28 to lift up.

Figure 13C:
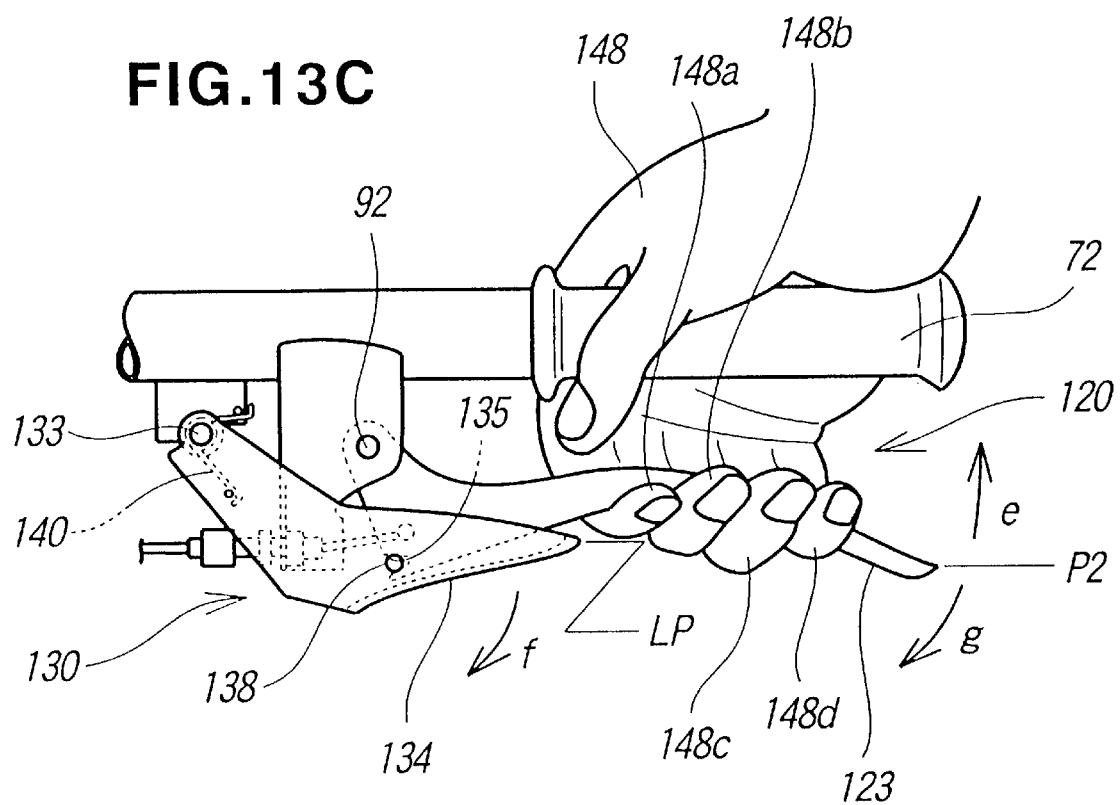
Figure 14:
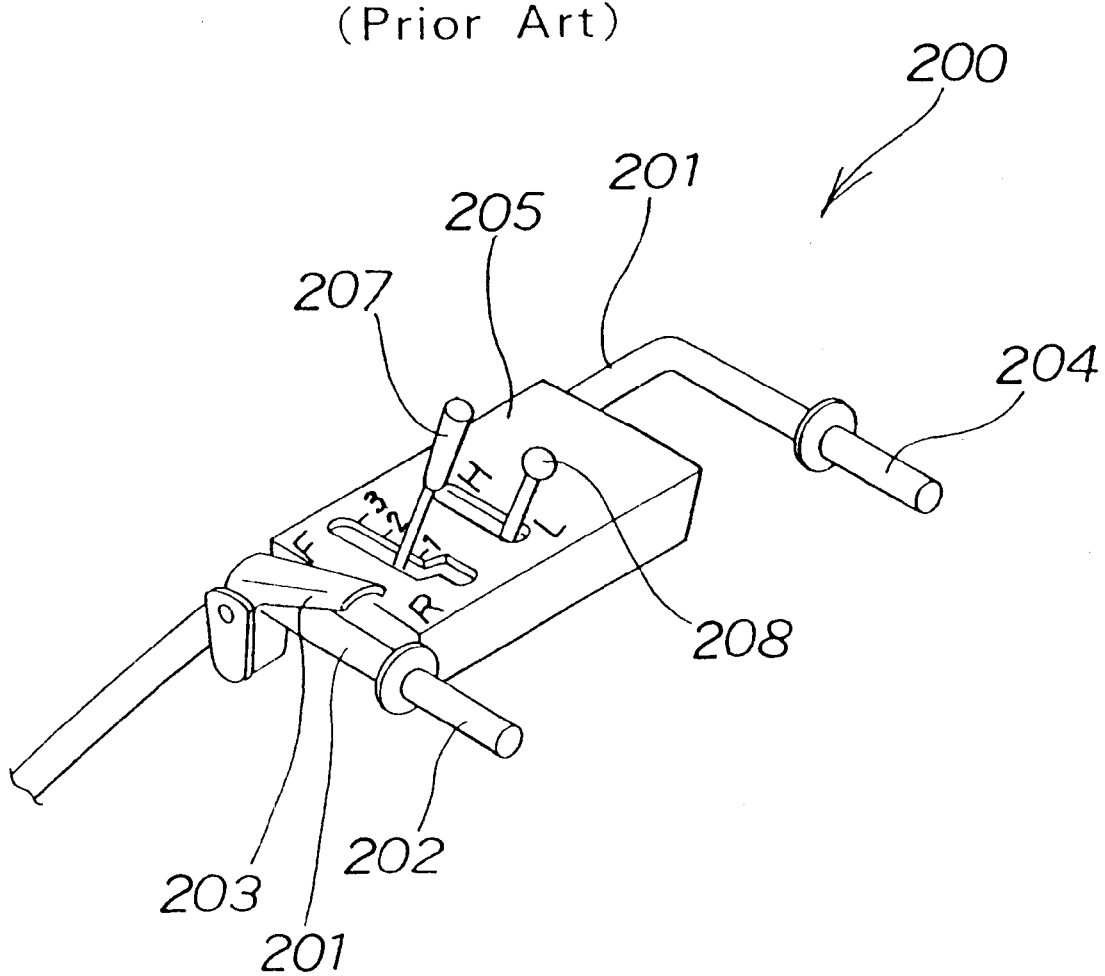
FIG. 14 is a perspective view showing an operating handle of a prior art snow removing machine equipped with a snow removing plate.

In FIG. 13C, releasing the fingers 148a to 148d of the right hand 148 from the right grip portion 72 and then gripping the operation lever 123 with the fingers 148a to 148d allows the lock pin 138 to disengage from the lock recess 135 as previously noted to move the operation lever 123 in a direction as shown by an arrow e. Thus, the lock pin 138 disengages from the lock recess 135, thereby releasing the engaging relationship between the lock pin 138 and the lock recess 135. Further, the lever segment 134 rotates about the center of the pivot pin 133 in a direction as shown by an arrow f by the action of the spring force of the twisted spring 140 to assume the releasing position Rp shown in FIG. 12.

After the lock pin 138 had disengaged from the lock recess 135 as discussed above, if the fingers 148a to 148d are released from the operation lever 123, the operation lever 123 rotates about the center of the pin 92 in the direction as shown by an arrow g. This causes the operation lever 123 to return to its fixed position P1.

When the operation lever 123 of the height control lever unit 120 returns to the fixed position P1 shown in FIG. 12, the swing arm 97 swings downward to assume its original position as shown in FIG. 5 such that the push rod 38 moves downward to close the control valve 40 again. Then, the high pressure gas 50 is prevented from flowing between the upper chamber 46 and the lower chamber 47, thereby allowing the snow removing plate 28 to be retained in the given position shown in FIG. 11.

In the snow removing machine of the third preferred embodiment, the lever lock mechanism 130, which is mounted to the handle (i.e., on the right horizontal tube 64), allows the operation lever 123 to be locked in the given position wherein the operation lever 123 being held in the gripped condition.

For this reason, during adjusting operation of the snow removing plate 28, that is, when the handle 60, i.e., the left and right grip portions 70,72 is moved downward or upward to adjust the height of the snow removing plate 28, it is needless for the operator to manipulate the operation lever 123. Thus, the operator may only move the grip portions 70,72 upward or downward, with a resultant decrease in the operator's working load.

It will thus be seen that during upward or downward movement of the grip portions 70,72, the operator does not need to manipulate the operation lever 123. In this instance, the operator can concentrate only in the operation for upward or downward movement of the grip portions 70,72, thereby performing the upward or downward movement of the grip portions 70,72 in the smooth fashion.

In the snow removing machine of the second preferred embodiment further, a simple swinging movement of the lever segment 134 of the lever lock mechanism 130 allows the lock pin 138 to engage with the lock recess 135. Thus, with such a simple operation for only swinging operation of the lever segment 134 caused by the operator renders the operation lever 123 to be locked in the given position wherein the operation lever 123 being held in the gripped condition.

In the second and third preferred embodiments discussed above, while the snow removal section has been described as an example employing the snow removing plate 28, the snow removal section may comprise other unit such as for example a rotary snow removing unit. In addition, although the present invention has been described for the snow removing machine which travels with the crawler belts 5, the present invention may also be applied to other type of a snow removing machine wherein the crawler belts 5 are replaced with wheels.

Obviously, various minor changes and modifications of the present invention are possible in the light of the above teaching. It is therefore to be understood that within the scope of the appended claims, the invention may be practiced otherwise than as specifically described.

What is claimed is:

1. A snow removing machine comprising:
a vehicle body having a body frame;
a snow removing section mounted on a front portion of the body frame for removing snow;
an operating handle mounted on a rear portion of the body frame and having a first handle portion and a second handle portion;
a pair of grip portions each mounted on a respective one of the first and second handle portions of the operating handle;
a forward and aft drive changeover switch mounted directly on the first handle portion of the operating handle for changing over a traveling direction of the vehicle body;
a height control operation lever mounted directly on the first handle portion of the operating handle for adjusting a height of the snow removing section; and
a speed control operation lever directly mounted on the second handle portion of the operating handle for adjusting a traveling speed of the vehicle body.

2. A snow removing machine according to claim 1; further comprising: a traveling frame mounted on the vehicle body; a drive wheel shaft mounted on the traveling frame for undergoing rotation; an idling wheel shaft mounted on the traveling frame for undergoing rotation; a pair of drive wheels mounted on the drive wheel shaft for rotation therewith; a pair of idling wheels mounted on the idling wheel shaft for rotation therewith; a first crawler belt entrained around one of the drive wheels and one of the idling wheels for rotation therewith; a second crawler belt entrained around the other of the drive wheels and the other of the idling wheels for rotation therewith; a height adjustment mechanism mounted between the traveling frame and the vehicle body to allow the height of the snow removing section to be adjusted when the height control operation lever is in a gripped state and to lock the snow removing section at the adjusted height position when the height control operation lever is released; and a lever lock mechanism mounted on the operating handle for locking the height control operation lever to prevent release of the height control operation lever from the gripped state.

3. A snow removing machine according to claim 2; wherein the lever lock mechanism comprises a lever segment mounted on the operating handle to undergo pivotal movement and having a lock recess, a spring member for retaining the lever segment in a locked position or in a released position, and a lock pin disposed on the operation lever for engagement with the lock recess of the lever segment in a state where the lever segment is retained in the released position.

4. A snow removing machine according to claim 2; wherein the lever lock mechanism comprises a lever segment mounted on the operating handle to undergo pivotal movement between a locked position and a released position of the lever segment, a spring member for retaining the lever segment in the released position, and a lock pin protruding from the lever segment for engagement with a lock recess formed in the height control operation lever when the lever segment pivots in a direction toward the locked position.

5. A snow removing machine according to claim 2; wherein the height adjustment mechanism comprises a cylinder containing a high pressure gas and connected to one of the vehicle body and the traveling frame, a piston rod connected to the other of the vehicle body and the traveling frame, a piston connected to the piston rod for undergoing movement in the cylinder, a control valve disposed in the piston, and a force transmission member for transmitting a force to the control valve to open the control valve when the height control operation lever is in the gripped state.

6. A snow removing machine comprising:
a body frame;
a snow removing section mounted on a front part of the body frame for removing snow;
an operating handle having first and second operating handle portions disposed at a rear part of the body frame;
a forward and aft drive changeover switch mounted on the first operating handle portion of the operating handle for changing over a traveling direction of the vehicle body;
a height control operation lever mounted on the first operating handle portion of the operating handle for adjusting a height of the snow removing section;
a speed control operation lever mounted on the second operating handle portion of the operating handle for adjusting a traveling speed of the vehicle body;
a first grip connected to the first operating handle portion to allow a first one of the hands of an operator to grip the height control operation lever with an adjustable gripping force and to manipulate the forward and aft drive changeover switch while gripping the first grip; and
a second grip connected to the second operating handle portion to allow a second one of the hands of the operator to grip the speed control operation lever with an adjustable gripping force while gripping the second grip.

7. A snow removing machine according to claim 6; wherein the forward and aft drive changeover switch and the height control operation lever are mounted directly on the first operating handle portion.

8. A snow removing machine according to claim 7; wherein the speed control operation lever is directly mounted on the second operating handle portion.

9. A snow removing machine according to claim 6; wherein the speed control operation lever is mounted directly on the second operating handle portion.

10. A snow removing machine according to claim 6; further comprising a pair of traveling frames mounted on the vehicle body, a height adjustment mechanism mounted between the traveling frames and the vehicle body to allow the height of the snow removing section to be adjusted when the height control operation lever is in a gripped state, and a lever lock mechanism mounted on the operating handle for locking the height control operation lever to prevent release of the height control operation lever from the gripped state.

11. A snow removing machine according to claim 10; wherein the lever lock mechanism comprises a lever segment mounted on the operating handle to undergo pivotal movement and having a lock recess, a spring member for retaining the lever segment in a locked position or in a released position, and a lock pin disposed on the operation lever for engagement with the lock recess of the lever segment in a state where the lever segment is retained in the released position.

12. A snow removing machine according to claim 10; wherein the lever lock mechanism comprises a lever segment mounted on the operating handle to undergo pivotal movement between a locked position and a released position of the lever segment, a spring member for retaining the lever segment in the released position, and a lock pin protruding from the lever segment for engagement with a lock recess formed in the height control operation lever when the lever segment pivots in a direction toward the locked position.

13. A snow removing machine according to claim 10; wherein the height adjustment mechanism comprises a cylinder containing a high pressure gas and connected to one of the. vehicle body and the traveling frames, a piston rod connected to the other of the vehicle body and the traveling frames, a piston connected to the piston rod for undergoing movement in the cylinder, a control valve disposed in the piston, and a force transmission member for transmitting a force to the control valve to open the control valve when the height control operation lever is in the gripped state.

14. A snow removing machine according to claim 6; further comprising a pair of traveling frames mounted on the vehicle body, a drive wheel shaft mounted on the traveling frames for undergoing rotation, an idling wheel shaft mounted on the traveling frame for undergoing rotation, a pair of drive wheels mounted on the drive wheel shaft for rotation therewith, a pair of idling wheels mounted on the idling wheel shaft for rotation therewith, a first crawler belt entrained around one of the drive wheels and one of the idling wheels for rotation therewith, and a second crawler belt entrained around the other of the drive wheels and the other of the idling wheels for rotation therewith.

15. A snow removing machine according to claim 6; wherein the forward and aft drive changeover switch is disposed proximate the first grip to allow the first hand of the user to selectively operate the forward and aft drive changeover switch to change a traveling direction of the vehicle body and/or grip the height control operation lever while gripping the first grip.

16. A snow removing machine comprising:

a vehicle body having a body frame;

a snow removing section mounted at a front part of the body frame for removing snow;

right and left operational handle members disposed at a rear part of the body frame so as to extend rearwardly of the body frame;

a forward and aft drive changeover switch mounted directly on the right operational handle member for changing over a traveling direction of the vehicle body;

a height control operation lever mounted directly on the right operational handle member for adjusting a height of the snow removing section; and a speed control operation lever mounted directly on the left operational handle member for adjusting a traveling speed of the vehicle body.

17. A snow removing machine according to claim 16; further comprising right and left grips mounted on respective ones of the right and left operational handle members to allow a right hand of an operator to grip the height control operation lever with an adjustable gripping force while the right hand grips the right grip and to allow a left hand of the operator to grip the speed control operation lever with an adjustable gripping force while the left hand grips the left grip.

18. A snow removing machine according to claim 17; wherein the forward and aft drive changeover switch is disposed proximate the right grip to allow the right hand of the user to selectively operate the forward and aft drive changeover switch to change a traveling direction of the vehicle body while the right hand grips the right grip.

19. A snow removing machine according to claim 16; further comprising a pair of traveling frames mounted on the vehicle body, a height adjustment mechanism mounted between the traveling frames and the vehicle body to allow the height of the snow removing section to be adjusted when the height control operation lever is in a gripped state, and a lever lock mechanism for locking the height control operation lever to prevent release of the height control operation lever from the gripped state.

20. A snow removing machine according to claim 19; wherein the height adjustment mechanism comprises a cylinder containing a high pressure gas and connected to one of the vehicle body and the traveling frames, a piston rod connected to the other of the vehicle body and the traveling frames, a piston connected to the piston rod for undergoing movement in the cylinder, a control valve disposed in the piston, and a force transmission member for transmitting a force to the control valve to open the control valve when the height control operation lever is in the gripped state.

* * * * *